United States Patent
Abbaszadeh et al.

(10) Patent No.: US 10,417,415 B2
(45) Date of Patent: Sep. 17, 2019

(54) AUTOMATED ATTACK LOCALIZATION AND DETECTION

(71) Applicant: General Electric Company, Schenectady, NY (US)

(72) Inventors: Masoud Abbaszadeh, Clifton Park, NY (US); Lalit Keshav Mestha, North Colonie, NY (US); Cody Bushey, Schenectady, NY (US); Daniel Francis Holzhauer, Santa Clara, CA (US)

(73) Assignee: General Electric Company, Schenectady, NY (US)

(*) Notice: Subject to any disclaimer, the term of this patent is extended or adjusted under 35 U.S.C. 154(b) by 165 days.

(21) Appl. No.: 15/478,425

(22) Filed: Apr. 4, 2017

(65) Prior Publication Data

US 2018/0157831 A1 Jun. 7, 2018

Related U.S. Application Data

(60) Provisional application No. 62/430,639, filed on Dec. 6, 2016.

(51) Int. Cl.
  *G06F 21/55* (2013.01)
  *G06N 20/00* (2019.01)
  *H04L 29/06* (2006.01)

(52) U.S. Cl.
  CPC .......... *G06F 21/552* (2013.01); *G06N 20/00* (2019.01); *H04L 63/1425* (2013.01); *G06F 2221/034* (2013.01); *H04L 63/14* (2013.01)

(58) Field of Classification Search
  CPC ................... H04L 63/14–1425; H04L 63/1491
  See application file for complete search history.

(56) References Cited

U.S. PATENT DOCUMENTS

| 8,191,136 B2 * | 5/2012 | Dudfield | H04L 41/0893 |
| | | | 709/224 |
| 2002/0032717 A1 * | 3/2002 | Malan | H04L 41/12 |
| | | | 718/105 |

(Continued)

FOREIGN PATENT DOCUMENTS

| WO | 2015092817 A1 | 6/2015 |
| WO | 2016139097 A1 | 9/2016 |

(Continued)

OTHER PUBLICATIONS

Gao, Wei et al., "On Cyber Attacks and Signature Based Intrusion Detection for Modbus Based Industrial Control Systems", The Journal of Digital Forensics, Security and Law, vol. 9, No. 1, 2014, (pp. 37-56, 20 total pages).

(Continued)

*Primary Examiner* — Daniel B Potratz
(74) *Attorney, Agent, or Firm* — Buckley, Maschoff & Talwalkar, LLC

(57) ABSTRACT

According to some embodiments, a threat detection computer platform may receive a plurality of real-time monitoring node signal values over time that represent a current operation of the industrial asset. For each stream of monitoring node signal values, the platform may generate a current monitoring node feature vector. The feature vector may also be estimated using a dynamic model output with that monitoring node signal values. The platform may then compare the feature vector with a corresponding decision boundary for that monitoring node, the decision boundary separating a normal state from an abnormal state for that monitoring node. The platform may detect that a particular monitoring node has passed the corresponding decision boundary and classify that particular monitoring node as being under attack. The platform may then automatically (Continued)

determine if the attack on that particular monitoring node is an independent attack or a dependent attack.

22 Claims, 20 Drawing Sheets

(56) References Cited

U.S. PATENT DOCUMENTS

| | | | |
|---|---|---|---|
| 2013/0132149 A1 | 5/2013 | Wei et al. | |
| 2013/0318022 A1* | 11/2013 | Yadav | G06N 5/02 |
| | | | 706/46 |
| 2014/0244192 A1 | 8/2014 | Craig et al. | |
| 2014/0283047 A1* | 9/2014 | Dixit | G06F 21/55 |
| | | | 726/23 |
| 2014/0298399 A1 | 10/2014 | Heo et al. | |
| 2015/0149174 A1* | 5/2015 | Gollan | G10L 15/285 |
| | | | 704/246 |
| 2016/0127931 A1* | 5/2016 | Baxley | G01S 5/0263 |
| | | | 455/67.16 |
| 2016/0328654 A1* | 11/2016 | Bauer | G06N 5/048 |
| 2017/0034205 A1* | 2/2017 | Canedo | H04L 63/1416 |
| 2017/0142133 A1* | 5/2017 | Kallos | H04L 63/1408 |
| 2017/0244726 A1* | 8/2017 | Finkel | H04L 63/0281 |
| 2018/0115561 A1* | 4/2018 | Sun | G05B 23/0208 |
| 2018/0268264 A1* | 9/2018 | Marwah | G01D 21/00 |
| 2018/0276375 A1* | 9/2018 | Arov | H04L 63/1416 |

FOREIGN PATENT DOCUMENTS

| | | |
|---|---|---|
| WO | 2016172514 A1 | 10/2016 |
| WO | 2016176682 A1 | 11/2016 |

OTHER PUBLICATIONS

Knowles, William et al., "A survey of cyber security management in industrial control systems", International Journal of Critical Infrastructure Protection, vol. 9, Issue C, Jun. 2015, (pp. 52-80, 29 total pages).

"Vencore Labs to Assist DARPA in Protecting the Nation's Electrical Grid", A Vertmarkets Marketplace for Industry professionals, Sep. 13, 2016, http://www.econline.com/doc/vencore-labs-to-assist-darpa-in-protecting-the-nation-s-electrical-grid-0001, 2pgs.

* cited by examiner $$x(k+1) = \begin{bmatrix} y(k+1) \\ y(k) \\ y(k-1) \\ \vdots \\ y(k-p+2) \end{bmatrix} = \begin{bmatrix} A_1 & A_2 & \cdots & A_{p-1} & A_p \\ I & 0 & \cdots & 0 & 0 \\ 0 & I & \cdots & 0 & 0 \\ \vdots & \vdots & \ddots & \vdots & \vdots \\ 0 & 0 & \cdots & I & 0 \end{bmatrix} \underbrace{\begin{bmatrix} y(k) \\ y(k-1) \\ y(k-2) \\ \vdots \\ y(k-p+1) \end{bmatrix}}_{x(k)} + \begin{bmatrix} b \\ 0 \\ 0 \\ \vdots \\ 0 \end{bmatrix} u(k) + \begin{bmatrix} I \\ 0 \\ 0 \\ \vdots \\ 0 \end{bmatrix} e(k)$$

$$y(k) = [I \quad 0 \quad \cdots \quad 0] x(k)$$

FIG. 10

| EFFECT / ATTACK | CPD | CTD | CTIM | FQG | DWATT | TTXM |
|---|---|---|---|---|---|---|
| CPD | 1 | 1 | 0 | 0 | 1 | 1 |
| CTD | 1 | 1 | 0 | 0 | 1 | 1 |
| CTIM | 0 | 0 | 1 | 0 | 0 | 0 |
| FQG | 0 | 0 | 0 | 1 | 1 | 1 |
| DWATT | 1 | 1 | 0 | 0 | 1 | 0 |
| TTXM | 1 | 1 | 1 | 0 | 0 | 1 |

FIG. 16

AUTOMATED ATTACK LOCALIZATION AND DETECTION

CROSS-REFERENCE TO RELATED APPLICATIONS

The present application claims the benefit of previously filed U.S. Provisional Patent Application No. 62/430,639 entitled "AUTOMATED ATTACK LOCALIZATION AND DETECTION USING FEATURE DRIVEN DYNAMIC MODELS" and filed on Dec. 6, 2016. The entire contents of that application are incorporated herein by reference.

BACKGROUND

Industrial asset control systems that operate physical systems (e.g., associated with power turbines, jet engines, locomotives, autonomous vehicles, etc.) are increasingly connected to the Internet. As a result, these control systems may be vulnerable to threats, such as cyber-attacks (e.g., associated with a computer virus, malicious software, etc.), that could disrupt electric power generation and distribution, damage engines, inflict vehicle malfunctions, etc. Current methods primarily consider threat detection in Information Technology ("IT," such as, computers that store, retrieve, transmit, manipulate data) and Operation Technology ("OT," such as direct monitoring devices and communication bus interfaces). Cyber-threats can still penetrate through these protection layers and reach the physical "domain" as seen in 2010 with the Stuxnet attack. Such attacks can diminish the performance of an industrial asset and may cause a total shut down or even catastrophic damage to a plant. Currently, Fault Detection Isolation and Accommodation ("FDIA") approaches only analyze sensor data, but a threat might occur even in other types of threat monitoring nodes such as actuators, control logical(s), etc. Also note that FDIA is limited only to naturally occurring faults in one sensor at a time. FDIA systems do not address multiple simultaneously occurring faults since they are normally due to malicious intent. Moreover, understanding and/or responding to threats in an industrial asset may depend at least in part on whether an attack is independent (e.g., new and unrelated to any other attack) or dependent attack (e.g., a result of an independent attack on other nodes appearing as an attack on the node under consideration due to feedback). Making this determination, however, can be a difficult task. It would therefore be desirable to protect an industrial asset from malicious intent, such as cyber-attacks, in an automatic and accurate manner.

SUMMARY

According to some embodiments, a threat detection computer platform may receive a plurality of real-time monitoring node signal values over time that represent a current operation of the industrial asset. For each stream of monitoring node signal values, the platform may generate a current monitoring node feature vector. The feature vector may also be estimated using a dynamic model associated with that monitoring node signal values. The monitoring node values may also be normalized. The platform may then compare the feature vector with a corresponding decision boundary for that monitoring node, the decision boundary separating a normal state from an abnormal state for that monitoring node. The platform may detect that a particular monitoring node has passed the corresponding decision boundary and classify that particular monitoring node as being under attack. The platform may then automatically determine if the attack on that particular monitoring node is an independent attack or a dependent attack.

Some embodiments comprise: means for receiving, at a threat detection computer platform, a plurality of real-time monitoring node signal values over time that represent a current operation of the industrial asset; for each stream of monitoring node signal values, means for generating, by the threat detection computer platform, a current monitoring node feature vector; means for comparing, by the threat detection computer platform, each feature vector with a corresponding decision boundary for that monitoring node, the decision boundary separating a normal state from an abnormal state for that monitoring node; means for detecting, by the threat detection computer platform, that a particular monitoring node has passed the corresponding decision boundary and classifying that particular monitoring node as being under attack; and means for automatically determining, by the threat detection computer platform, if the attack on that particular monitoring node is an independent attack or a dependent attack.

Some technical advantages of some embodiments disclosed herein are improved systems and methods to protect an industrial asset from malicious intent such as cyber threats in an automatic and accurate manner.

As used herein, the term "attack" might refer to a malicious activity that was intelligently designed as well as to situations that arise naturally, such as an equipment fault or failure.

BRIEF DESCRIPTION OF THE DRAWINGS

FIG. 10 illustrates a VAR(p) model conversion into a standard state space structure according to some embodiments.

FIG. 16 is a causal dependency matrix of monitoring nodes in accordance with some embodiments.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Figure 1:
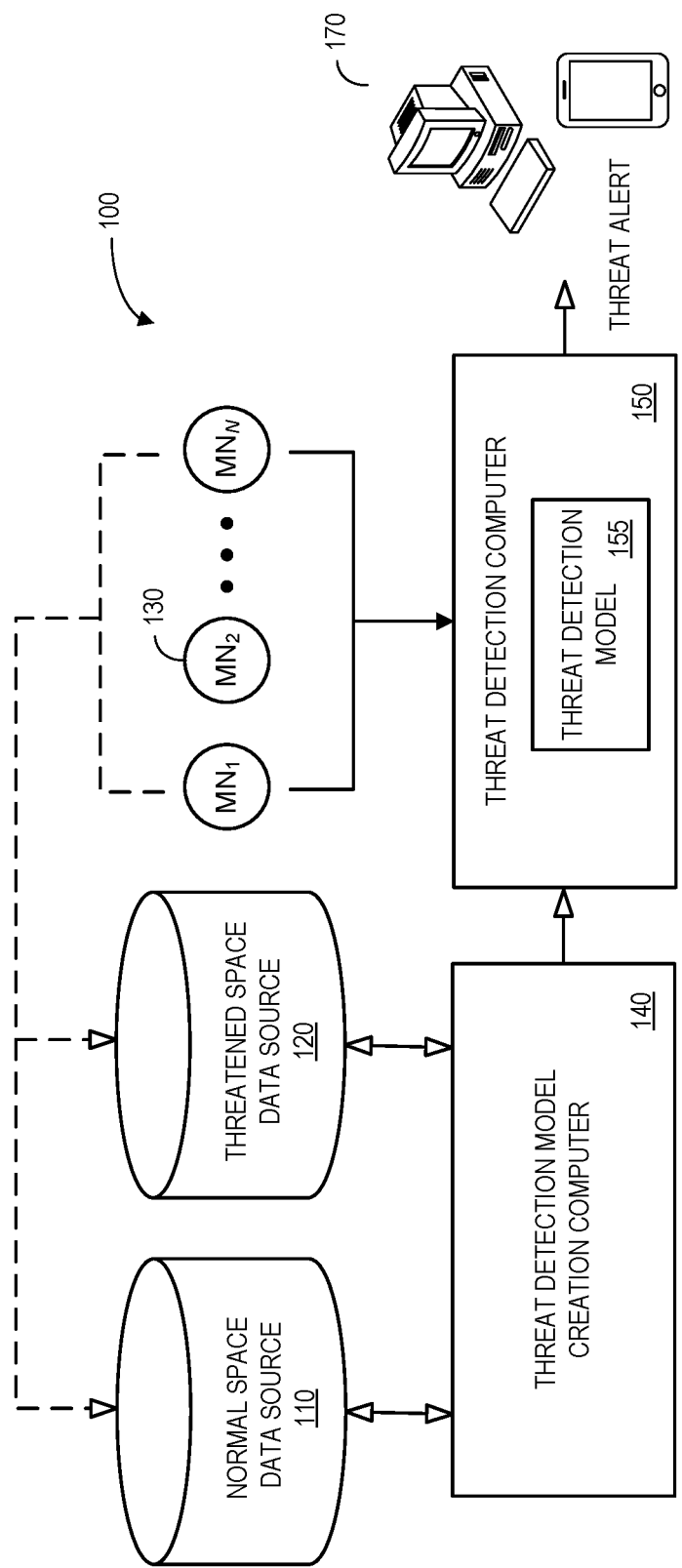
FIG. 1 is a high-level block diagram of a system that may be provided in accordance with some embodiments.

Industrial control systems that operate physical systems are increasingly connected to the Internet. As a result, these control systems may be vulnerable to threats and, in some cases, multiple attacks may occur simultaneously. Existing approaches to protect an industrial asset, such as FDIA approaches, may not adequately address these threats—especially when multiple, simultaneous attacks occur. It would therefore be desirable to protect an industrial asset from cyber threats in an automatic and accurate manner. FIG. 1 is a high-level architecture of a system 100 in accordance with some embodiments. The system 100 may include a "normal space" data source 110 and a "threatened space" data source 120. The normal space data source 110 might store, for each of a plurality of "monitoring nodes" 130 (shown in FIG. 1 as "$MN_1$," "$MN_2$," . . . , "$MN_N$" for "1, 2, . . . , N" different monitoring nodes), a series of normal values over time that represent normal operation of an industrial asset (e.g., generated by a model or collected from actual monitoring node 130 data as illustrated by the dashed line in FIG. 1). As used herein, the phrase "monitoring node" might refer to, for example, sensor data, signals sent to actuators, motors, pumps, and auxiliary equipment, intermediary parameters that are not direct sensor signals not the signals sent to auxiliary equipment, and/or control logical(s). These may represent, for example, threat monitoring nodes that receive data from the threat monitoring system in a continuous fashion in the form of continuous signals or streams of data or combinations thereof. Moreover, the nodes may be used to monitor occurrences of cyber-threats or abnormal events. This data path may be designated specifically with encryptions or other protection mechanisms so that the information may be secured and cannot be tampered with via cyber-attacks. The threatened space data source 120 might store, for each of the monitoring nodes 130, a series of threatened values that represent a threatened operation of the industrial asset (e.g., when the system is experiencing a cyber-attack).

Information from the normal space data source 110 and the threatened space data source 120 may be provided to a threat detection model creation computer 140 that uses this data to create a decision boundary (that is, a boundary that separates normal behavior from threatened behavior). The decision boundary may then be used by a threat detection computer 150 executing a threat detection model 155. The threat detection model 155 may, for example, monitor streams of data from the monitoring nodes 130 comprising data from sensor nodes, actuator nodes, and/or any other critical monitoring nodes (e.g., monitoring nodes $MN_1$ through $MN_N$), calculate at least one "feature" for each monitoring node based on the received data, and "automatically" output a threat alert signal to one or more remote monitoring devices 170 when appropriate (e.g., for display to a user). According to some embodiments, a threat alert signal might be transmitted to a unit controller, a plant Human-Machine Interface ("HMI"), or to a customer via a number of different transmission methods. Note that one receiver of a threat alert signal might be a cloud database that correlates multiple attacks on a wide range of plant assets. As used herein, the term "feature" may refer to, for example, mathematical characterizations of data. Examples of features as applied to data might include the maximum, minimum, mean, standard deviation, variance, range, current value, settling time, Fast Fourier Transform ("FFT") spectral components, linear and non-linear principal components, independent components, sparse coding features, deep learning features, etc. Moreover, term "automatically" may refer to, for example, actions that can be performed with little or no human intervention. According to some embodiments, information about a detected threat may be transmitted back to the industrial asset.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The threat detection model creation computer 140 may store information into and/or retrieve information from various data sources, such as the normal space data source 110 and/or the threatened space data source 120. The various data sources may be locally stored or reside remote from the threat detection model creation computer 140 (which might be associated with, for example, offline or online learning). Although a single threat detection model creation computer 140 is shown in FIG. 1, any number of such devices may be included. Moreover, various devices described herein might be combined according to embodiments of the present invention. For example, in some embodiments, the threat detection model creation computer 140 and one or more data sources 110, 120 might comprise a single apparatus. The threat detection model creation computer 140 functions may be performed by a constellation of networked apparatuses, in a distributed processing or cloud-based architecture.

A user may access the system 100 via one of the monitoring devices 170 (e.g., a Personal Computer ("PC"), tablet, smartphone, or remotely through a remote gateway connection) to view information about and/or manage threat information in accordance with any of the embodiments described herein. In some cases, an interactive graphical display interface may let a user define and/or adjust certain parameters (e.g., threat detection trigger levels) and/or provide or receive automatically generated recommendations or results from the threat detection model creation computer 140 and/or threat detection computer 150.

Figure 2:
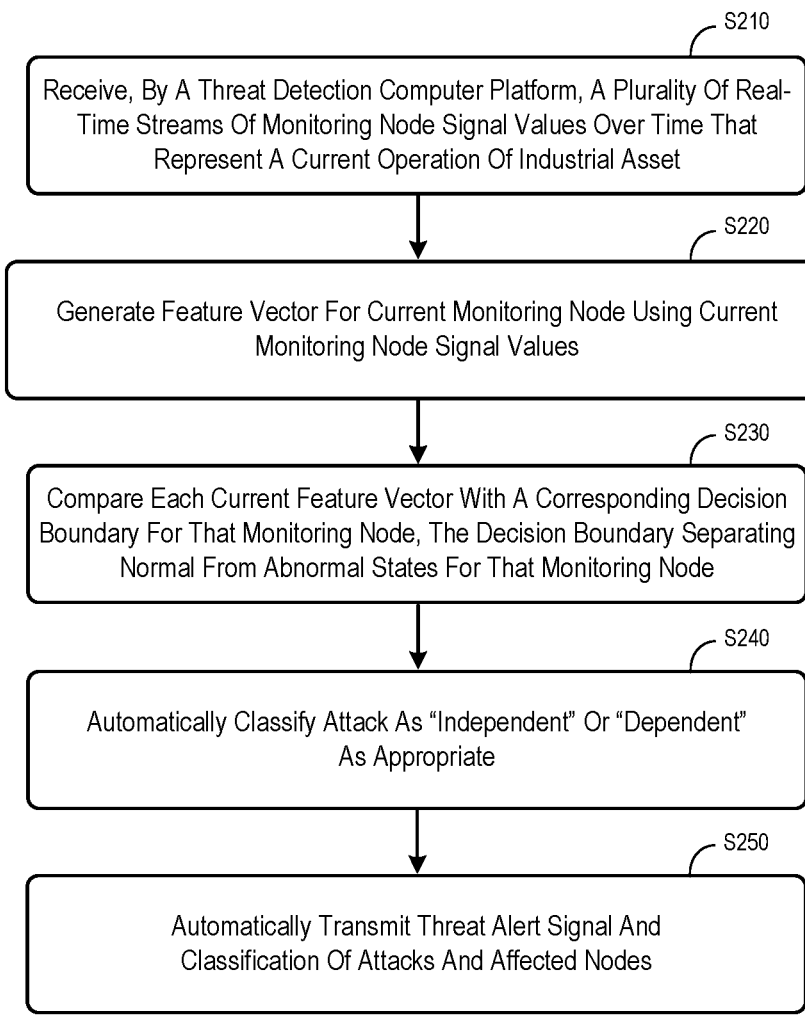
FIG. 2 is a method according to some embodiments.

For example, FIG. 2 illustrates a method that might be performed by some or all of the elements of the system 100 described with respect to FIG. 1. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a plurality of real-time monitoring node signal inputs may receive streams of monitoring node signal values over time that represent a current operation of an industrial asset. At least one of the monitoring nodes (e.g., control nodes, etc.) may be associated with, for example, sensor data, an auxiliary equipment input signal, a control intermediary parameter, valves, circuit breakers, and/or a control logic value.

At S220, a threat detection computer platform may receive the streams of monitoring node signal values and, for each stream of monitoring node signal values, generate a feature vector for the current monitoring node using the current monitoring node signal values. Note that generation of the feature vector may include processing via one of feature transforms, identity transforms, and feature-based dynamic models. According to some embodiments, at least one of the current monitoring node feature vectors is associated with principal components, statistical features, deep learning features, frequency domain features, time series analysis features, logical features, geographic or position based locations, and/or interaction features.

At S230, each generated current monitoring node feature vector may be compared to a corresponding decision boundary (e.g., a linear boundary, non-linear boundary, multi-dimensional boundary, etc.) for that monitoring node, the decision boundary separating a normal state from an abnormal state for that monitoring node. According to some embodiments, at least one monitoring node is associated with a plurality of multi-dimensional decision boundaries and the comparison at S230 is performed in connection with each of those boundaries. Note that a decision boundary might be generated, for example, in accordance with a feature-based learning algorithm and a high fidelity model or a normal operation of the industrial asset. Moreover, at least one decision boundary may exist in a multi-dimensional space and be associated with a dynamic model which is constructed using data obtained from design of experiments such as, a full factorial design, Taguchi screening design, a central composite methodology, a Box-Behnken methodology, and a real-world operating conditions methodology. In addition, a threat detection model associated with a decision boundary might, according to some embodiments, be dynamically obtained and adapted based on a transient condition, a steady state model of the industrial asset, and/or data sets obtained while operating the system as in self-learning systems from incoming data stream.

At S240, an attack identified at S230 may be classified as either an "independent attack" or "dependent attack" in accordance with any of the embodiments described herein. For example, the classification might be based on a causal dependency test, a propagation path fulfillment test, and/or a time separation test, etc. as described with respect to FIG. 12. At S250, the system may automatically transmit a threat alert signal (e.g., a notification message, etc.) based on results of the comparisons performed at S230 along with a classification of the attack (e.g., as determined at S240) and affected nodes. The threat might be associated with, for example, an actuator attack, a controller attack, a monitoring node attack, a plant state attack, spoofing, physical damage, unit availability, a unit trip, a loss of unit life, and/or asset damage requiring at least one new part. According to some embodiments, one or more response actions may be performed when a threat alert signal is transmitted. For example, the system might automatically shut down all or a portion of the industrial asset (e.g., to let the detected potential cyber-attack be further investigated). As other examples, one or more parameters might be automatically modified, a software application might be automatically triggered to capture data and/or isolate possible causes, etc. Note that a thread alert signal might be transmitted via a cloud-based system, such as the PREDIX® field agent system. Note that according to some embodiments, a cloud approach might also be used to archive information and/or to store information about boundaries.

According to some embodiments, the system may further localize or otherwise analyze an origin of the threat to a particular monitoring node. For example, the localizing may be performed in accordance with a time at which a decision boundary associated with one monitoring node was crossed as compared to a time at which a decision boundary associated with another monitoring node was crossed. According to some embodiments, an indication of the particular monitoring node might be included in the threat alert signal. In the method of FIG. 2, the system may automatically classify an attack as either an "independent attack" (e.g., a new attack unrelated to any prior attack) or a "dependent attack" (e.g., an abnormal status resulting from a previously detected attack).

Some embodiments described herein may take advantage of the physics of an industrial asset by learning a priori from tuned high fidelity equipment models and/or actual "on the job" data to detect single or multiple simultaneous adversarial threats to the system. Moreover, according to some embodiments, all monitoring node data may be converted to features using advanced feature-based methods, and the real-time operation of the industrial asset may be monitoring in substantially real-time. Abnormalities may be detected by classifying the monitored data as being "normal" or disrupted (or degraded). This decision boundary may be constructed using dynamic models and may help to enable early detection of vulnerabilities (and potentially avert catastrophic failures) allowing an operator to restore the industrial asset to normal operation in a timely fashion.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with DoE techniques. Moreover, multiple algorithmic methods (e.g., support vector machines, one of the machine learning techniques) may be used to generate decision boundaries. Since boundaries may be driven by measured data (or data generated from high fidelity models), defined boundary margins may help to create a threat zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account an operator's knowledge about system operation (e.g., the differences between normal and abnormal operation).

Note that many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple monitoring nodes and specific locations). Embodiments may incorporate any number of features, with more features allowing the approach to become more accurate as the system learns more about the physical process and threat. According to some embodiments, dissimilar values from monitoring nodes may be normalized to unit-less space, which may allow for a simple way to compare outputs and strength of outputs.

Thus, some embodiments may provide an advanced anomaly detection algorithm to detect cyber-attacks on, for example, key gas turbine control sensors. The algorithm may identify which signals(s) are being attacked using control signal-specific decision boundaries and may inform an industrial asset to take accommodative actions. In particular, a detection and localization algorithm might detect whether a sensor, auxiliary equipment input signal, control intermediary parameter, or control logical are in a normal or anomalous state. Some examples of gas turbine monitoring nodes that might be analyzed include: critical control sensors (e.g., a generator power transducer signal, a gas turbine exhaust temperature thermocouple signal, a gas turbine speed signal, etc.); control system intermediary parameters (e.g., generator power, gas turbine exhaust temperature, compressor discharge pressure, compressor discharge temperature, compressor pressure ratio, fuel flow, compressor inlet temperature, guide vane angle, fuel stroke reference, compressor bleed valve, inlet bleed heat valve, etc.); auxiliary equipment input signals (e.g., signals sent to actuators, motors, pumps, etc.); and/or logical commands to controller.

Some embodiments of the algorithm may utilize feature-based learning techniques based on high fidelity physics models and/or machine operation data (which would allow the algorithm to be deployed on any system) to establish a high dimensional decision boundary. As a result, detection may occur with more precision using multiple signals, making the detection more accurate with less false positives. Moreover, embodiments may detect multiple attacks on control signals, and rationalize where the root cause of attack is and where it originated from. For example, the algorithm may decide if a signal is anomalous because of a previous signal attack, or if it is instead independently under attack. This may be accomplished, for example, by monitoring the evolution of the features as well as by accounting for time delays between attacks.

Figure 3:
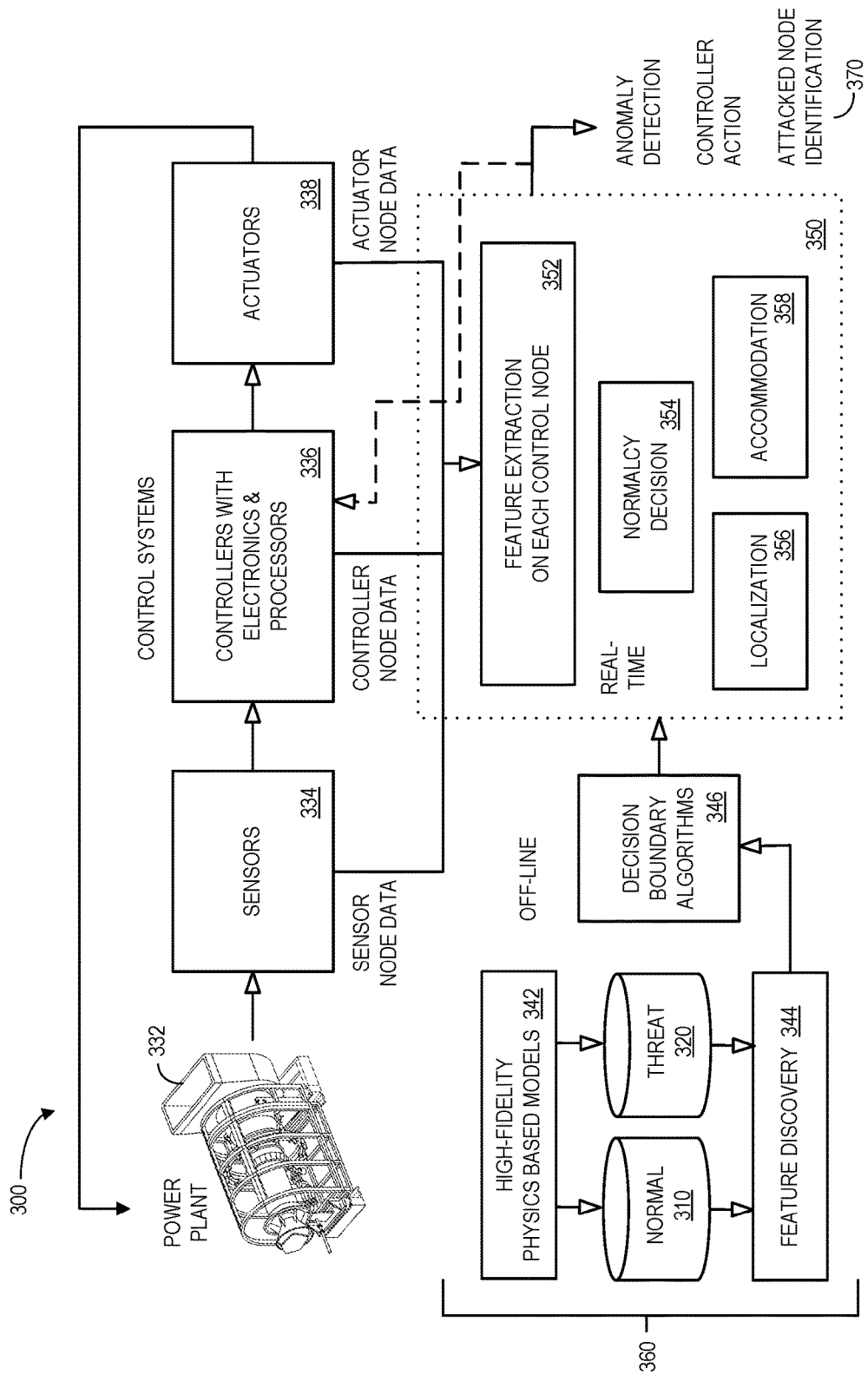
FIG. 3 is threat alert system in accordance with some embodiments.

A cyber-attack detection and localization algorithm may process a real-time turbine signal data stream and then compute features (multiple identifiers) which can then be compared to the sensor specific decision boundary. In some embodiments, generating features may involve simply performing an identity transform. That is, the original signal might be used as it is. A block diagram of a system 300 utilizing a sensor specific gas turbine cyber-attack detection and localization algorithm according to some embodiments is provided in FIG. 3. In particular, a power plant 332 provides information to sensors 334 which helps controllers with electronics and processors 336 adjust actuators 338. A threat detection system 360 may include one or more high-fidelity physics based models 342 associated with the power plant 332 to create normal data 310 and/or threat data 320. The normal data 310 and threat data 320 may be accessed by a feature discovery component 344 and processed by decision boundary algorithms 346 while off-line (e.g., not necessarily while the power plant 332 is operating). The decision boundary algorithms 346 may generate a threat model including decision boundaries for various monitoring nodes. Each decision boundary may separate two data sets in a high dimensional space which is constructed by running a binary classification algorithm, such as a support vector machine using the normal data 310 and threat data 320 for each monitoring node signal (e.g., from the sensors 334, controllers 336, and/or the actuators 338).

A real-time threat detection platform 350 may receive the boundaries along with streams of data from the monitoring nodes. The platform 350 may include a feature extraction on each monitoring node element 352 and a normalcy decision 354 with an algorithm to detect attacks in individual signals using sensor specific decision boundaries, as well rationalize attacks on multiple signals, to declare which signals were attacked, and which became anomalous due to a previous attack on the system via a localization module 356. An accommodation element 358 may generate outputs 370, such as an anomaly decision indication (e.g., threat alert signal), a controller action, and/or a list of attached monitoring nodes.

During real-time detection, contiguous batches of control signal data may be processed by the platform 350, normalized and the feature vector extracted. The location of the vector for each signal in high-dimensional feature space may then be compared to a corresponding decision boundary. If it falls within the attack region, then a cyber-attack may be declared. The algorithm may then make a decision about where the attack originally occurred. An attack may sometimes be on the actuators 338 and then manifested in the sensor 334 data. Attack assessments might be performed in a post decision module (e.g., the localization element 356) to isolate whether the attack is related to the sensor, controller, or actuator (e.g., indicating which part of the monitoring node). This may be done by individually monitoring, overtime, the location of the feature vector with respect to the decision boundary. For example, when a sensor 334 is spoofed, the attacked sensor feature vector will cross the decision boundary earlier than the rest of the vectors as described with respect to FIGS. 4 through 6. If a sensor is declared to be anomalous, and the load command to the auxiliary equipment is later determined to be anomalous, it may be determined that the original attack, such as signal spoofing, occurred on the sensor 334. Conversely, if the signal to the auxiliary equipment was determined to be anomalous first, and then later manifested in the sensor 334 feedback signal, it may be determined that the signal to the equipment was initially attacked.

According to some embodiments, it may be detected whether or not a signal is in the normal operating space (or abnormal space) through the use of localized decision boundaries and real time computation of the specific signal features. Moreover, an algorithm may differentiate between a sensor being attacked as compared to a signal to auxiliary equipment being attacked. The control intermediary parameters and control logical(s) may also be analyzed using similar methods. Note that an algorithm may rationalize signals that become anomalous. An attack on a signal may then be identified.

Figure 4:
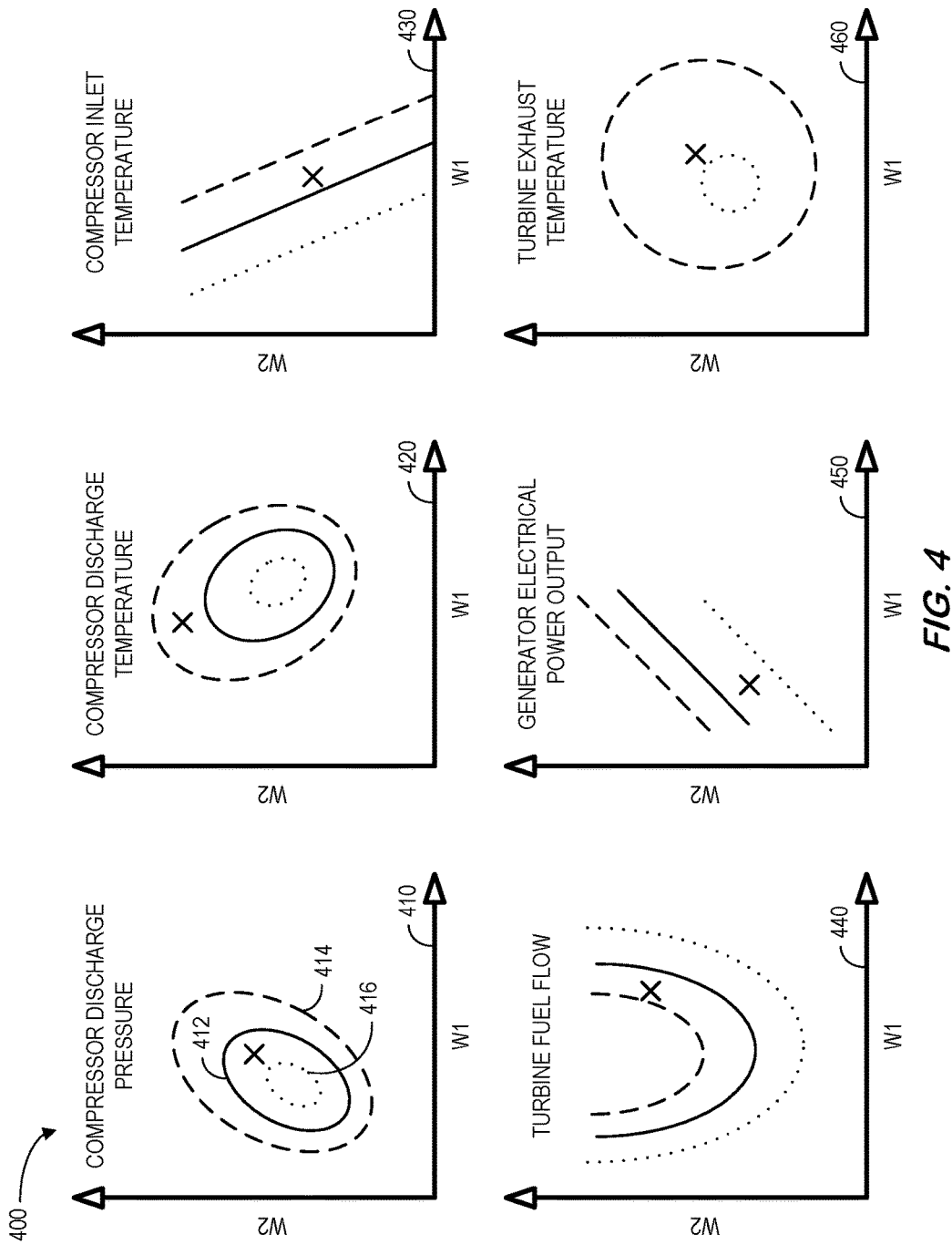
FIGS. 4 through 6 illustrate boundaries and feature vectors for various monitoring node parameters according to some embodiments.

FIG. 4 illustrates 400 boundaries and feature vectors for various monitoring node parameters in accordance with some embodiments. In particular, for each parameter a graph includes a first axis representing value weight 1 ("w1"), a feature 1, and a second axis representing value weight 2 ("w2"), a feature 2. Values for w1 and w2 might be associated with, for example, outputs from a Principal Component Analysis ("PCA") that is performed on the input data. PCA might be one of the features that might be used by the algorithm to characterize the data, but note that other features could be leveraged.

A graph is provided for compressor discharge pressure 410, compressor discharge temperature 420, compressor inlet temperature 430, turbine fuel flow 440, generator electrical power output 450, and turbine exhaust temperature 460. Each graph includes an average boundary 412 (solid line), minimum boundary 414 (dotted line), and maximum boundary 416 (dashed line) and an indication associated with current feature location for each monitoring node parameter (illustrated with an "X" on the graph). As illustrated in FIG. 4, the current monitoring node location is between the minimum and maximum boundaries (that is, the "X" is between the dotted and dashed lines). As a result, the system may determine that the operation of the industrial asset is normal (and no threat is being detected indicating that the system is currently under attack).

Figure 5:
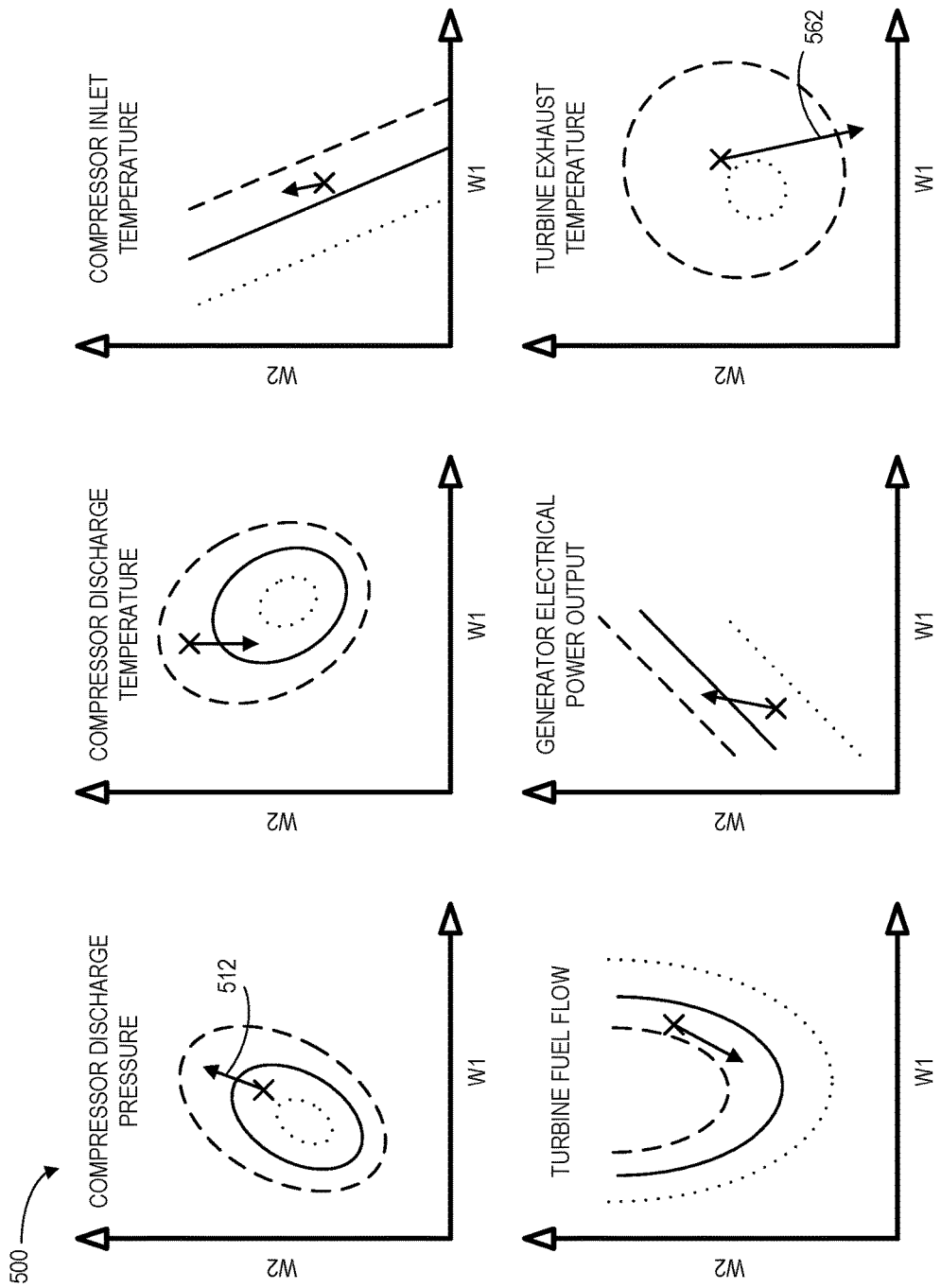

FIG. 5 illustrates 500 subsequent boundaries and feature vectors for these parameters. Consider, for example, a feature vector movement 512 for the compressor discharge pressure. Even though feature vector 512 has moved, it is still within the maximum and minimum boundaries and, as a result, normal operation of that monitoring node may be determined. This is the case for the first five graphs in FIG. 5. In this example, a feature vector movement 562 for the turbine exhaust temperature has exceeded with maximum boundary and, as a result, abnormal operation of that monitoring node may be determined. For example, a threat may exist for the exhaust temperature scale factor, which is a corrective value. The result is that the feature for the intermediary control signal illustrated in FIG. 5 moves 562 such that it is anomalous. The algorithm detects this cyber-attack, and two parallel actions might be initiated. One action may be post processing of the signal to discover what was attacked, in this case if the system has been monitoring each exhaust thermocouple, it may conclude that none of them are currently abnormal. Therefore, it may be determined that something used to calculate this feature was attacked. The other action may be to continually monitor and detect additional attacks. Such an approach may facilitate a detection of multiple signal attacks.

Given the example of FIG. 5, assume that the gas turbine exhaust temperature signal was attacked. This may cause the system to respond in such a way so as to put other signals into an abnormal state. This is illustrated 600 in FIG. 6, where the attack has already been detected and now other signals shown to be abnormal. In particular, feature movement for the compressor discharge pressure 612, compressor discharge temperature 622, compressor inlet temperature 632, and turbine fuel flow 642 have all become abnormal (joining the feature vector for the turbine exhaust temperature 662). Note that the feature vector for generator electrical power output did not become abnormal. In order to decide whether or not these signals 612, 622, 632, 642 are truly currently under attack, a historical batch with pertinent feature vector information may be kept for some duration of time. Then when an attack is detected on another signal, this batch is examined, and the time at which the confirmed attack on gas turbine exhaust temperature as well as several subsequent elements is analyzed. According to some embodiments described herein, an automated process might be used to determine if an abnormal condition is associated with an independent or independent attach (e.g., as described in connection with FIGS. 11 and 12).

Note that one signal rationalization might be associated with a system time delay. That is, after a sensor is attacked there might be a period of time before the system returns to a steady state. After this delay, any signal that becomes anomalous might be due to an attack as opposed to the system responding.

The current methods for detecting abnormal conditions in monitoring nodes are limited to FDIA (which itself is very limited). The cyber-attack detection and localization algorithms described herein can not only detect abnormal signals of sensors, but can also detect signals sent to auxiliary equipment, control intermediary parameters and/or control logical(s). The algorithm can also understand multiple signal attacks. One challenge with correctly identifying a cyber-attack threat is that it may occur with multiple sensors being impacted by malware. According to some embodiments, an algorithm may identify in real-time that an attack has occurred, which sensor(s) are impacted, and declare a fault response. To achieve such a result, the detailed physical response of the system must be known to create acceptable decision boundaries. This might be accomplished, for example, by constructing data sets for normal and abnormal regions by running Design of Experiments ("DoE") experiments on high-fidelity models. A data set for each sensor might comprise a feature vector for given threat values (e.g., turbine speed, thermocouple scale factor, etc.). Full factorial, Taguchi screening, central composite and Box-Behnken are some of the known design methodologies used to create the attack space. When models are not available, these DoE methods are also used to collect data from real-world power generator systems. Experiments may be run at different combinations of simultaneous attacks. In some embodiments, the system may detect degraded/faulty operation as opposed to a cyber-attack. Such decisions might utilize a data set associated with a degraded/faulty operating space. At the end of this process, the system may create data sets such as "attack v/s normal" and "degraded v/s normal" for use while constructing decision boundaries. Further note that a decision boundary may be created for each signal using data sets in feature space. Various classification methods may be used to compute decision boundaries. For example, binary linear and non-linear supervised classifiers are examples of methods that could be used to obtain a decision boundary.

Figure 6:
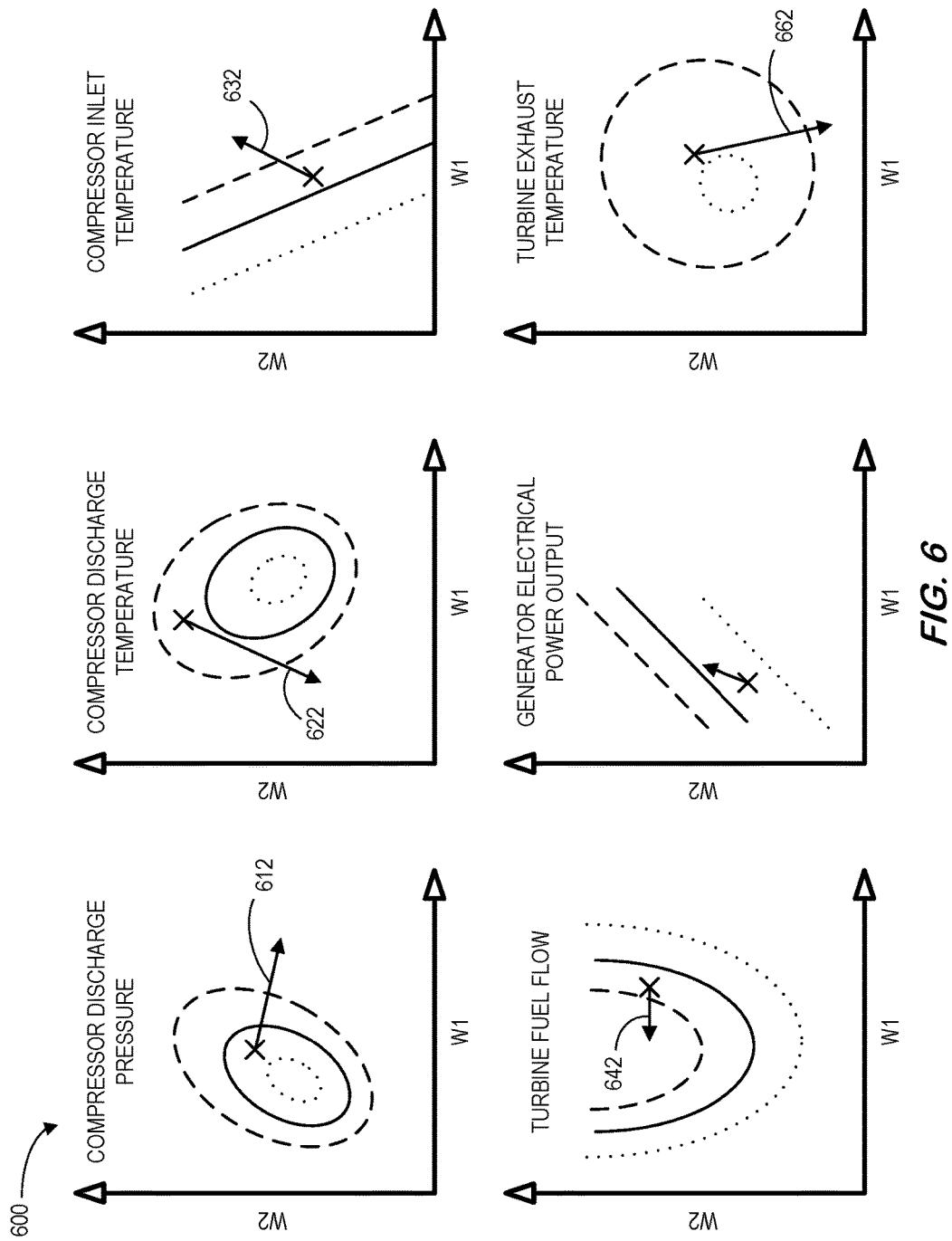

In some cases, multiple vector properties might be examined, and the information described with respect to FIGS. 4 through 6 may be processed to determine if the signal had been trending in a specific direction as the attack was detected (or if it had just been moving due to noise). Had the signal been uniformly trending as the attack took place and afterward, then this signal is a response to the original attack and not an independent attack.

Figure 7:
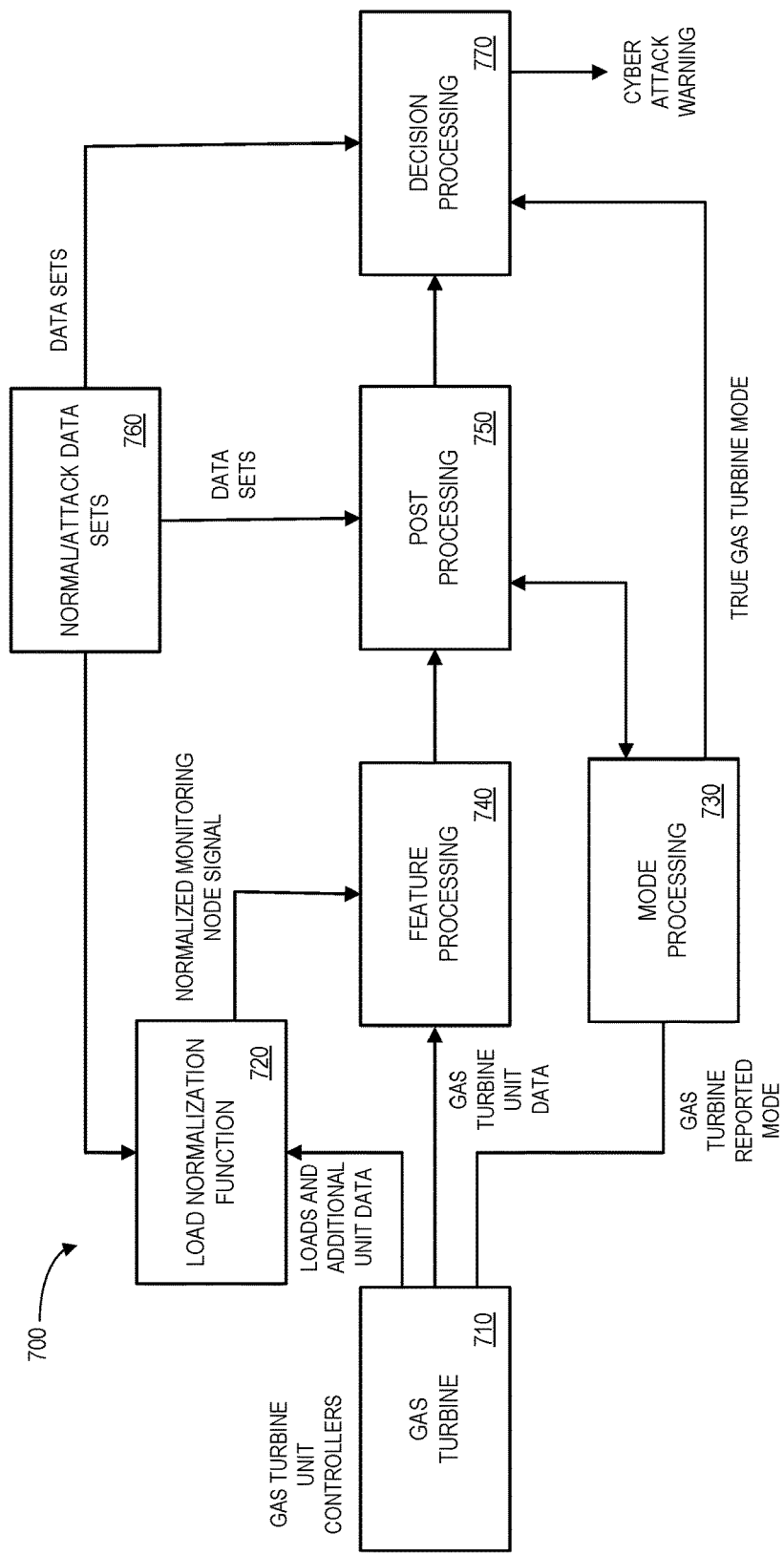
FIG. 7 illustrates a block diagram view of a cyber-attack detection system in accordance with some embodiments.

Note that an industrial asset may be associated with non-linear operations over a range of operating parameters (e.g., loads, temperatures, etc.). As a result, data variations can be substantial and determining when a cyber threat is present based on operation of the control system may be difficult. FIG. 7 illustrates a block diagram view of a cyber-attack detection system 700 in accordance with some embodiments. In particular, the system 700 illustrates a gas turbine 710 (e.g., associated with gas turbine unit controllers) that transmits information about loads (e.g., gas turbine loads, Adaptive Real-time Engine Simulation ("ARES" loads, etc.) to a load normalization function 720. The gas turbine 710 may also transmit information, to mode processing 730 (e.g., a gas turbine reported mode of operation) and feature processing 740 (e.g., gas turbine unit data). The load normalization function 720 might, for example, transmit a normalized monitoring node signal to feature processing 740. Post processing 750 may receive information from feature processing 740 and transmit data to decision processing 770 (which can automatically create a cyber-attack warning based at least in part on data sets received from a normal/attack data sets storage unit 760).

Figure 8:
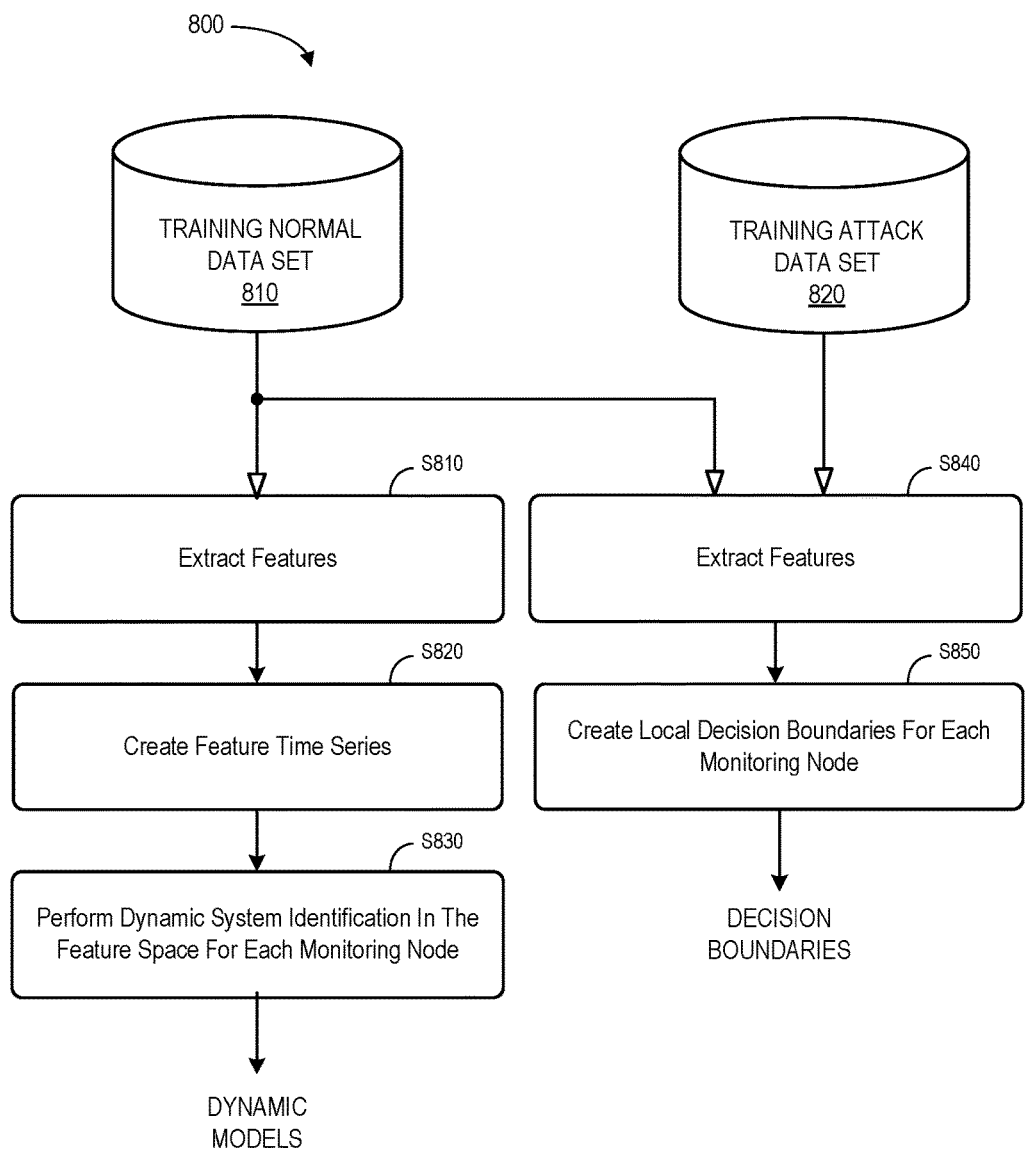
FIG. 8 is method that might be associated with an off-line training process for an automated attack localization system according to some embodiments.

FIG. 8 is method 800 that might be associated with an off-line training process for an automated attack localization system according to some embodiments. During a training phase (off-line), a training normal data set 810 and a training attack data set 820 may be used to create local decision boundaries in the feature space using data-driven learning methods such as support vector machines. In particular, at S810 information from the training normal data set 810 may be used to extract features which are then used to create a feature time series at S820. The system may then perform dynamic system identification at S830 in the feature space for each monitoring node to create appropriate dynamic models.

At S840, information from the training normal data set 810, the training attack data set 820, and dynamic models may be used to generate features and create decision boundaries. The system may then create local decision boundaries as appropriate for each monitoring node at S850. Note that the number of features used for each boundary might be selected based on an optimization of the detection rate and false alarm rate. Also note that the feature extraction and boundary generation process may be performed individually on each and every monitoring node. In a similar fashion, features may be extracted to be used for dynamic system identification as values of features evolve over time. The features used for dynamic modeling might be, for example, from the training normal data set 810 (or a data set generated from the models with attacks and normal operational behavior). Features extracted from the training normal data set 810 may use a sliding time window over the time-series data in the physical space to create new time series of feature evolution in the feature space. Then, the feature time series may be used for dynamic modeling. The dynamic models may be, for example, in the state space format.

According to some embodiments, a multivariate Vector Auto-Regressive ("VAR") model approach may be used to fit dynamic models into feature time series data. A VAR model may, for example, have the following form:

$$y(k+1)=A_1 y(k)+A_2 y(k-1)+ \ldots +A_p(k-p+1)+b+e(k)$$

where y(k) is the value of the multivariate feature time series at sample time t, p is the number of lags (i.e., delays) in the model, b is a constant affine term, and e(k) is white Gaussian random noise. The size of the y vector, m, may equal the number of features selected. A VAR(p) model may be identified for each monitoring node, resulting in matrices $A_1$ to $A_p$, the b vector, and covariance matrix Q of e, for each node.

Figure 9:
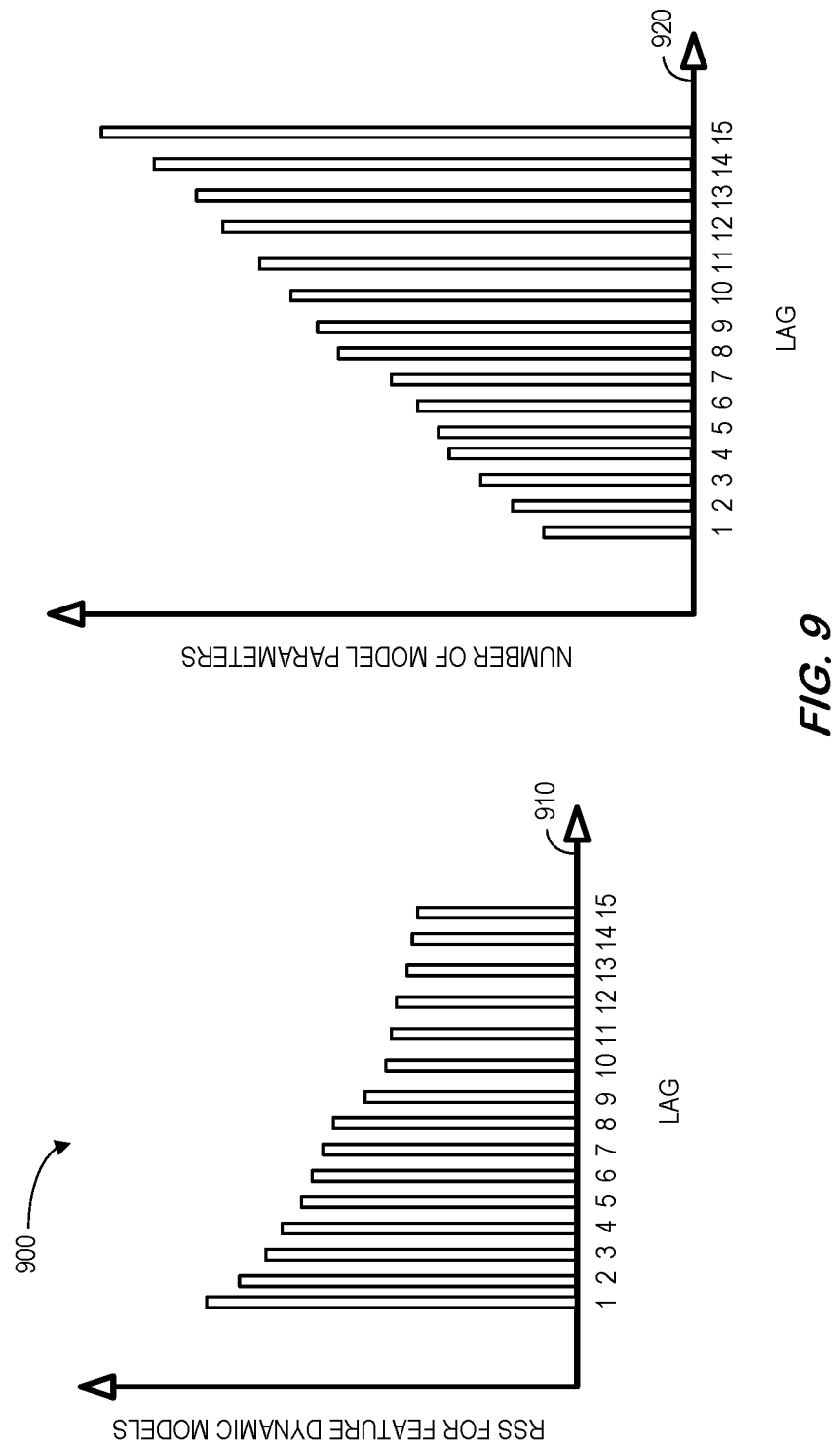
FIG. 9 illustrates relationships between Residuals Sum of Squares ("RSS") and number of model parameters, per different lag numbers (i.e., order of the model) for feature-driven dynamic models and lags in accordance with some embodiments.

As the number of lags in the VAR model increase, the model fits better into the training data set but there are more parameters n of the model to be estimated. For example, FIG. 9 illustrates 900 relationships between Residuals Sum of Squares ("RSS") for feature-driven dynamic models, lags, and a number of model parameters in accordance with some embodiments. In particular, a first graph 910 shows RSS for feature dynamic models for lags from 1 through 15. Note that the number of parameters in the model for VAR(p) models might have m=5 features (and thus five individual parameters might be included on the graph). The RSS decreases as the number of lags increases. A second graph 920 shows the number model parameters for each lag from 1 through 15. Note that the number of model parameters increases as the number of lags increases.

The order of the VAR model, p, may selected automatically using Bayesian Information Criterion ("BIC") or Akaike Information Criterion ("AIC"). Note that BIC may provide a good balance between the model fitness and complexity (e.g., in order to avoid over-fitting). The system may use a weighted average of features to compute the BIC per different lag numbers. In computing the weighted average BIC, the BIC value of each feature might be weighted by the magnitude of the feature so that the features with higher magnitudes are weighted more, and as such fitting a better model to those features becomes more important. The number of lags in the model, p, is then selected based on the value of p, that minimize the weighted averaged BIC. The identified VAR(p) model may then be converted 1000 into standard state space structure as illustrated in FIG. 10. This process may be done separately for each monitoring node, which may be the result of different values of p for each monitoring node. Note that the conversion 1000 of FIG. 10 may be written in compact form as:

$$x(k+1)=Ax(k)+Bu(k)+Ee(k)$$

$$y(k)=Cx(k)$$

where, u(k) is a fictitious unit step input to accommodate for the affine term. During the training phase, one such state space feature-driven dynamic model may be built for each monitoring node. Although a VAR modeling approach is described herein, note that other modeling approaches might be used instead in any of the embodiments (e.g., a Markov model approach).

Figure 11:
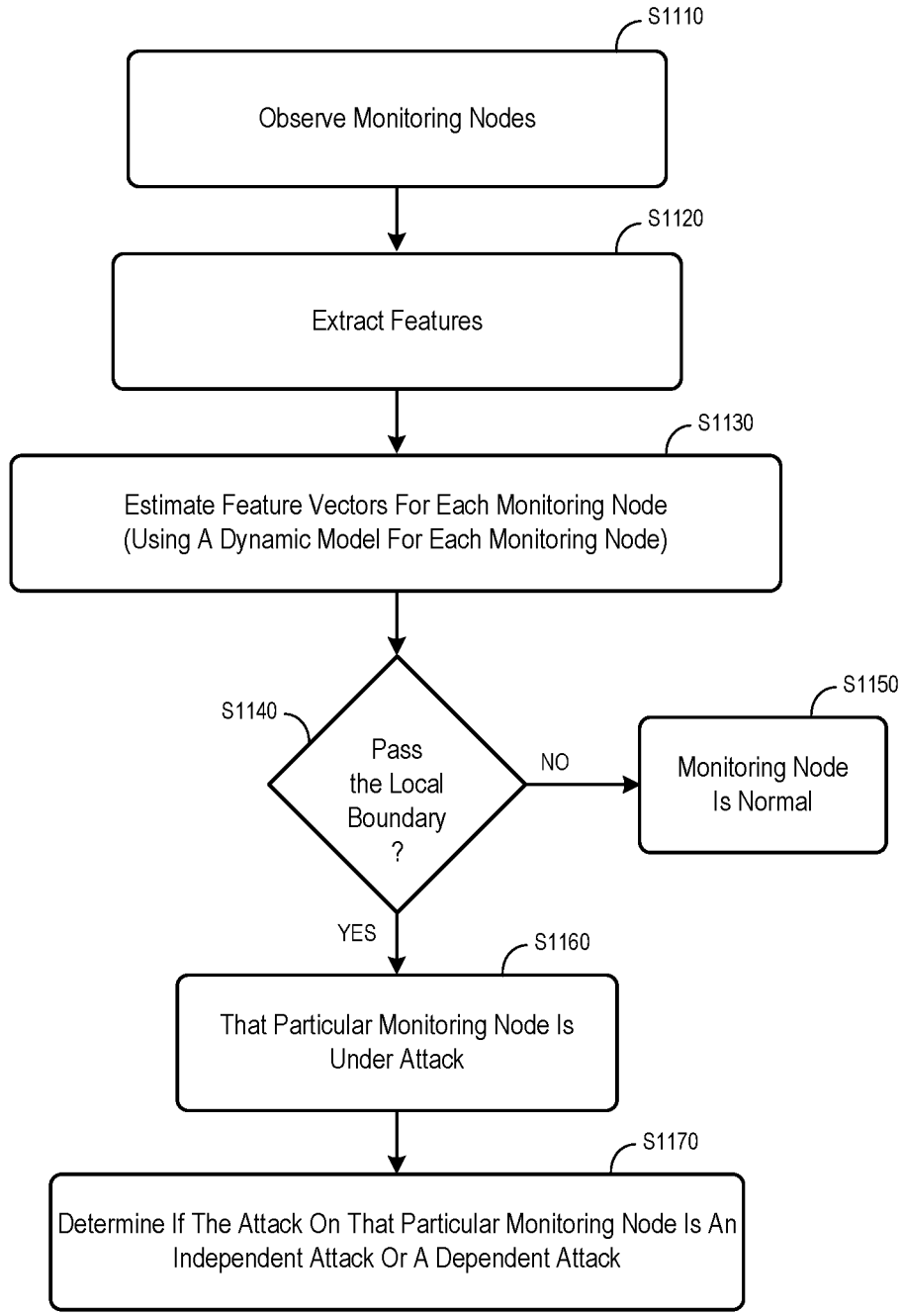
FIG. 11 is a method that might be associated with an on-line operational process in accordance with some embodiments.

FIG. 11 is a method that might be associated with an on-line operational process in accordance with some embodiments. After observing the monitoring nodes at S1110, the features are extracted at S1120 from each observation of each monitoring node. Then using the dynamic models identified in a training phase, each model then generates filtered or estimated features at S1130 using stochastic estimation techniques, such as Kalman filtering. In some embodiments, dynamic models may not be required to further filter or estimate features. The covariance matrix of the process noise needed for the stochastic estimator is readily available here as Q, which can be computed during training phase as the covariance of the error term e(t). Then the output of each stochastic estimator is compared against its corresponding local decision boundary at S1140, also computed and pre-stored during the training phase. If the local boundary is not passed at S1140, the monitoring node is normal at S1150. Each monitoring node with an estimated feature that violates the corresponding decision boundary is reported as being under attack at S1160.

In the next stage, the system post-processes the localized attack and determines whether the detected attack is an independent attack or it is an artifact of the previous attack through propagation of the effects in the closed-loop feedback control system at S1170. This may provide additional information and insight and may be useful when multiple attacks are detected at the same time.

Figure 12:
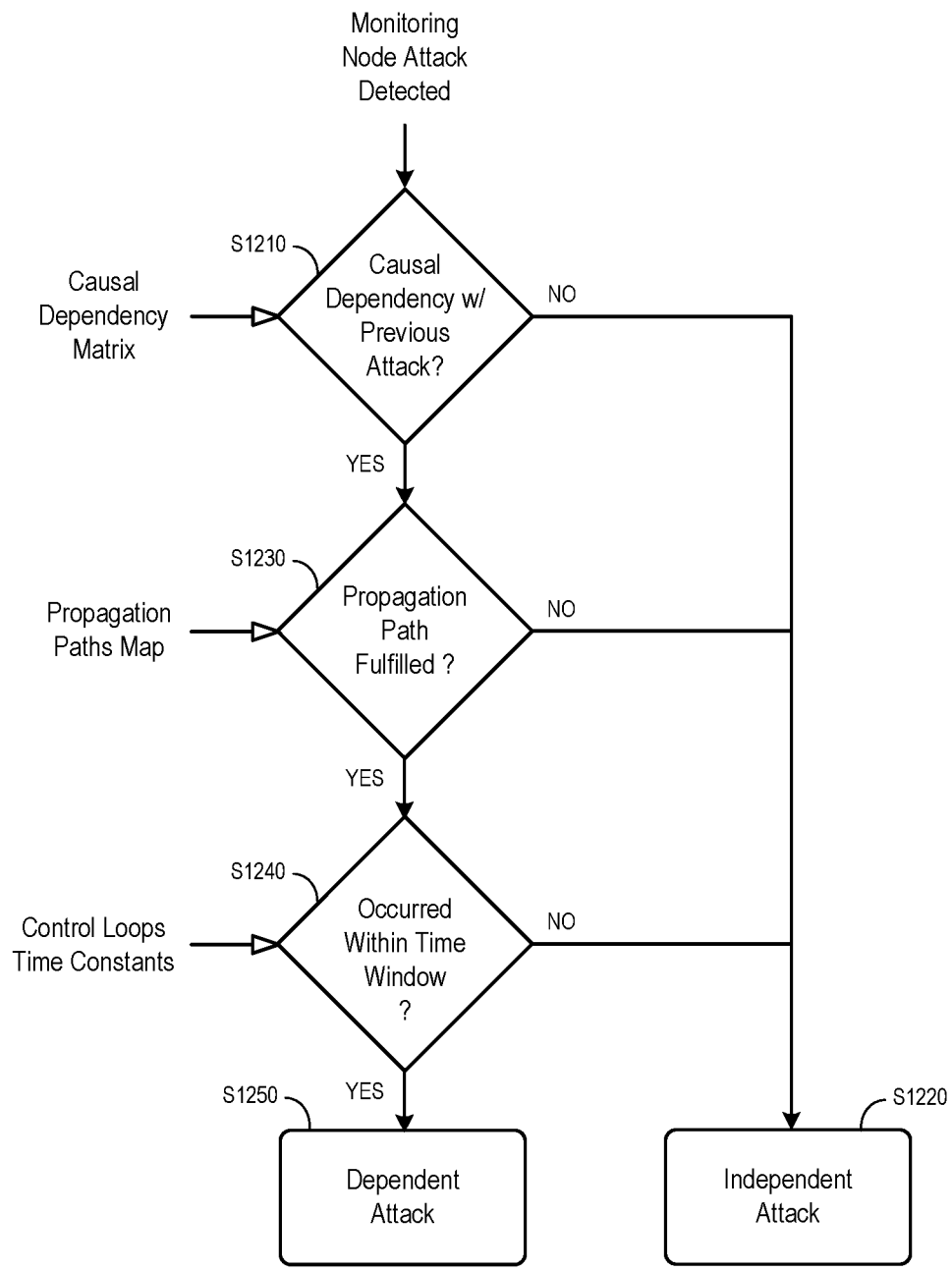
FIG. 12 is a method of determining whether an attack is an independent attack or a dependent attack according to some embodiments.

For example, FIG. 12 is a method of determining whether an attack is an independent attack or a dependent attack according to some embodiments. According to some embodiments, three tests may be performed to determine if an attack should be classified as an "independent attack" or a "dependent attack:" (1) a causal dependency test, (2) a propagation path test, and (3) a time separation test. Together, these three tests are referred to herein as the "attack dependency conformance test." At S1210, a causal dependency matrix may be used to determine if the current attack was potentially caused by a previous attack. If the current attack could not have been caused by a previous attack at S1210, it is classified as an "independent attack" at S1220. In this causality test, the system may check whether there is a potential causal dependency between the newly detected attack and any previously detected attack on other monitoring nodes. This check might be based on, for example, a binary matrix of causal dependencies between any two nodes (e.g., as described with respect to FIG. 16). The causal dependency matrix might be generated, according to some embodiments, based on domain knowledge. If no such possible dependencies exist, the attack is reported as an "independent attack" at S1220. Otherwise, the system may perform a second check.

In particular, at S1230 a propagation paths map may be used to determine if the current attack potentially propagated from a previous attack. If the current attack could not have propagated from a previous attack at S1230, it is classified as an "independent attack" at S1220. In this propagation test, for each causal dependency the system may check whether a propagation path is fulfilled. This might mean that, for example, if the effect of node 1 being under attack is propagated to node 4, through node 3, then an anomaly in node 1 can cause an anomaly on node 4 only if node 3 is already anomalous. The anomaly propagation paths might also be defined by domain knowledge and pre-stored in the localization system. If no such propagation paths are fulfilled, then the attack is reported an "independent attack" at S1220. Otherwise, the system may perform the third check.

At S1240, control loops time constraints may be used to determine if the current attack was potentially caused by a previous attack based on time separation. If the current attack could not have been caused by a previous attack based on time separation at S1240, it is classified as an "independent attack" at S1220. This time separation test may utilize the fact that if the attacked monitoring under investigation is an artifact of the closed-loop feedback system, then the effect should arise within a time window between the rise time and the settling time of the control loop corresponding to the monitoring node. However, since the system uses a dynamic estimator, a propagation time may need to be added throughout the estimator. Using n features, and p lags in the models, the dynamic estimator will have n*p states, and therefore adds n*p sampling times delay into the system. Therefore, the expected time window for a dependent attack to occur might be defined by:

$$1.5 * \tau + n*p < \Delta t < 5 * \tau + n*p$$

where $\Delta t$ is the time after any previously detected attacks on other nodes that has passed checks 1 and 2, and $\tau$ is the time constant of the control loop responsible for the current node under investigation. If such a time-separation check is not passed, the system reports the attack as an independent attack at S1220.

If it is determined at S1250 that the current attack meets the time separation test (and, therefore, also meets both the propagation test of S1230 and the causal dependency test of S1240), the current attack is classified as a "dependent attack" at S2150.

Note that other attack and anomaly detection techniques may only provide a binary status of the overall system (whether it is under attack or not). Embodiments described herein may provide an additional layer of information by localizing the attack and determining not only if the system is under attack (or not) but also which node is exactly under attack.

As a result, embodiments may provide a significant and automated solution to attack localization. Note that the attack localization information may be important when responding to the attack, including operator action plans and resilient control under attack. Embodiments described herein may handle multiple simultaneous anomalies in the system, which is beyond the capability of the conventional fault detection systems. This may also let the approaches described herein be used as a fault detection and isolation technique for more sophisticated, multiple-fault scenarios. Further, distributed detection and localization systems enabled by embodiments described herein across multiple equipment and systems may allow for a coordination of data to detect and precisely pin-point coordinated multi-prong attacks. This may further enable a relatively quick way to perform forensics and/or analysis after an attack.

Note that some embodiments may analyze information in the feature space, which has many advantages over working in the original signal spaces, including high-level data abstraction and modeling high dimensional spaces without adding substantial computational complexity. The feature-based method for localization may also extend feature vectors and/or incorporate new features into existing vectors as new learnings or alternate sources of data become available. Embodiments described herein may also enable use of heterogeneous sensor data in a large scale interconnected system, even when the data comes from many geospatially located heterogeneous sensors (i.e., conventional plant sensors, unconventional sensors such as cell-phone data, logical, etc.). This may offer additional commercial advantages for post-mortem analysis after an attack.

Figure 13:
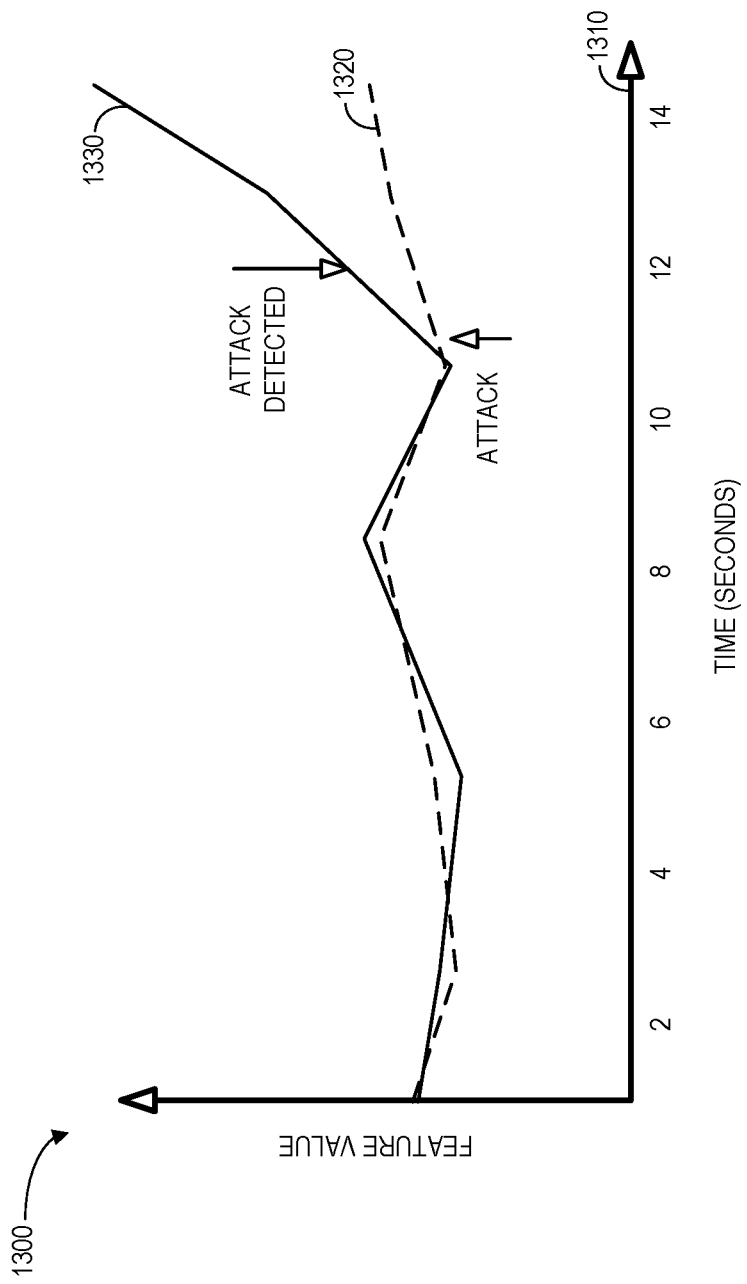
FIG. 13 illustrates a feature time series of an attack comparing the real-time feature of a monitoring node to the modeled feature of the monitoring node according to some embodiments.

FIG. 13 illustrates a feature time series 1300 of a first attack example comparing the real-time feature of a monitoring node to the modeled feature of a monitoring node via a graph 1310 according to some embodiments. In particular, the examples described with respect to FIGS. 13 through 16 involve the following parameters for a gas power turbine (similar to those values described with respect to FIGS. 4 through 6):

Compressor Discharge Pressure ("CPD"),
Compressor Discharge Temperature ("CTD"),
Compressor Inlet Temperature ("CTIM"),
Turbine Fuel Flow ("FQG"),
Generator Electrical Power Output ("DWATT"), and
Turbine Exhaust Temperature ("TTXM").

Consider, for example, an attack on TTXM. In this single attack scenario, the system may want to verify whether it can detect and localize the attacked node. As illustrated in FIG. 13, the attack is detected at t=11 sec. Using the embodiments described herein, the attack is detected within 1 sec and correctly localized to TTXM. FIG. 13 shows the measured feature time series of the detected and localized attack 1330 along with the generated features 1320 estimated using stochastic model-based estimation.

Figure 14:
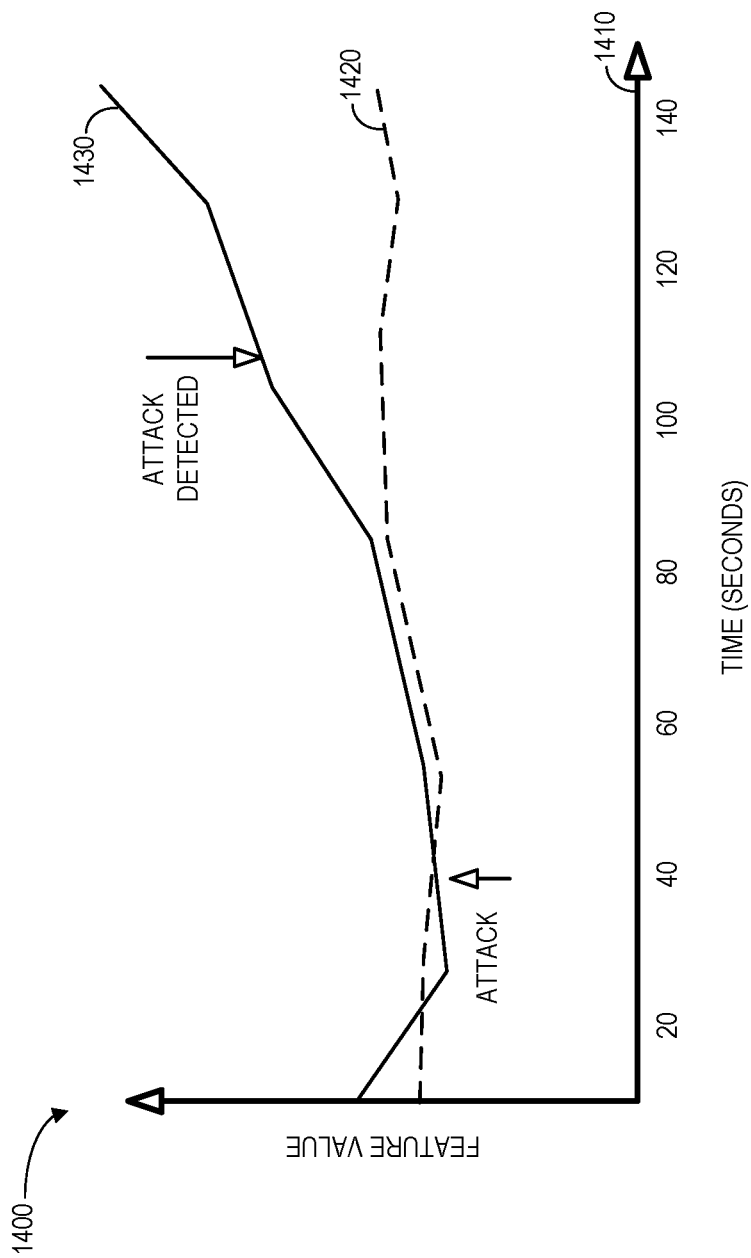
FIG. 14 illustrates a feature time series of a stealthy attack comparing the real-time feature of a monitoring node to the modeled feature of a monitoring node in accordance with some embodiments.
Figure 15:
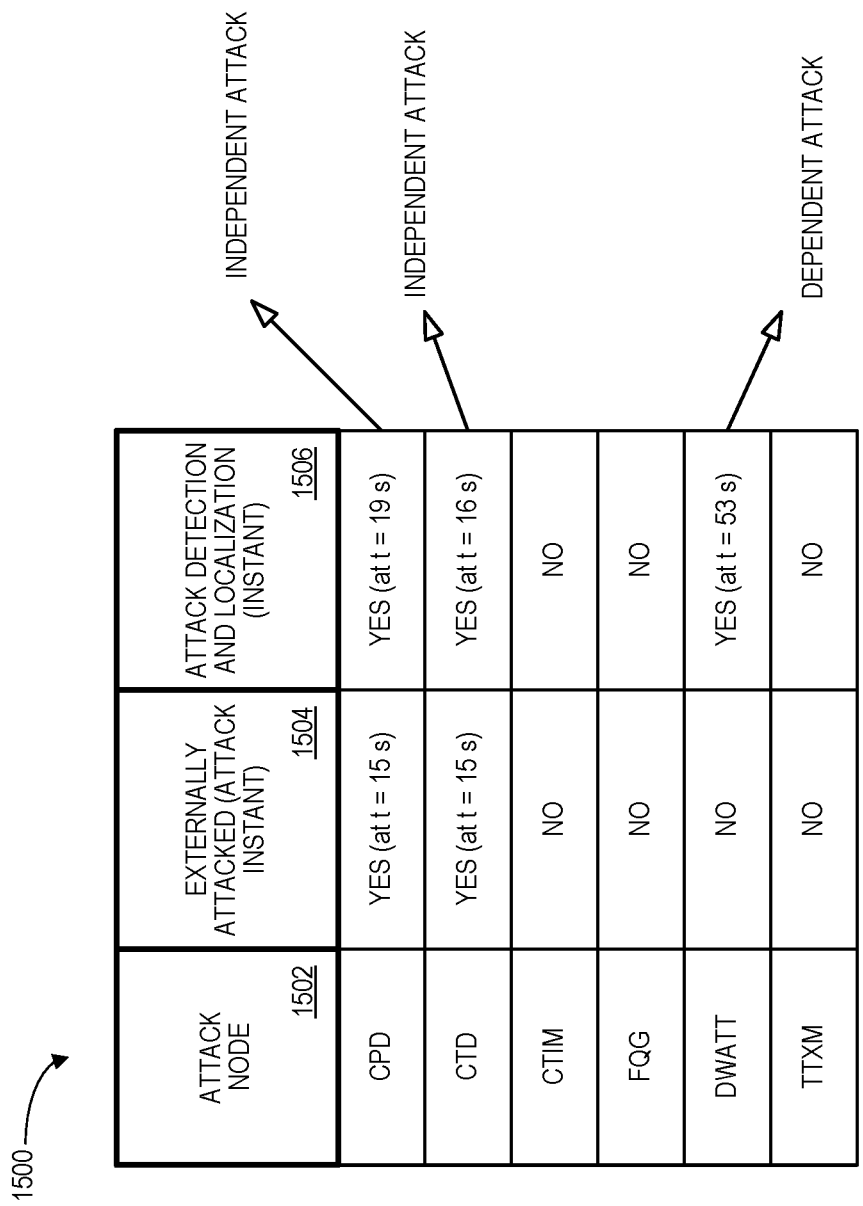
FIG. 15 is an example of attack localization in a multiple-attack scenario according to some embodiments.

FIG. 14 illustrates a feature time series 1400 via a graph 1410 of a second (stealthy) attack comparing the real-time feature of a monitoring ode to the modeled feature of a monitoring node in accordance with some embodiments. That is, this is again an attack on TTXM but this time the attack simulates a stealthy attack in which the sensor is tampered with slowly over time and/or elaborately. Such stealthy attacks are designed to pass the existing fault diagnosis system and can remain in the control system for a long time without being detected. In this simulation, the attack was applied at t=40 sec. Using the localization methods described herein, the attack was detected at t=105 sec, and is correctly localized to TTXM. FIG. 14 shows the measured feature time series of the detected and localized attack 1430 along with the expected features 1420 estimated using the stochastic model-based estimation.

In a third attack scenario, the system may simulate a simultaneous attack on two monitoring nodes. Two sensors are attacked at the same time, namely CPD and CTD, and both attacks are applied at t=15 sec. Using embodiments described herein, both attacks are truly detected and localized within seconds. Out of the other 4 sensors, 3 are correctly not detected at all. One is detected (DWATT) at a later time, which is dependent attack. The results are summarized in the table 1500 of FIG. 15. In particular, the table 1500 lists the attack nodes 1502 along with associated externally attacked data 1504 and attack detection and localization data 1506.

In this third example (illustrated in the table 1500), there are two externally injected attacks on CPD and CTD. The first attack is detected at t=16 sec and localized to CTD. Since there is no previously detected attack, the causality test fails and this attack is correctly reported as an "independent attack." The second attack is detected at t=19 sec and correctly localized to CPD. In this case, there is causal dependency and a direct proportion path from CTD to CPD. The causal dependency matrix 1600 for this example is shown in FIG. 16. The matrix 1600 lists each potential attack node and whether or not that node can have an effect on each other node (with a "1" indicating a potential effect and a "0" indicating no potential effect).

The second attack therefore passes both the causality test and the proportion test. However, based on time separation criterion, in order for the CPD attack to be a dependent attack it must have happened within $4.25<\Delta t<9.5$ sec after the CTD detection instance. The actual $\Delta t$ illustrated in the table 1500 is 3 sec (that is, 19 sec-16 sec). Therefore, the time separation test is not passed and, as a result, the CPD attack is correctly reported as an "independent attack."

At t=53 sec, the DWATT sensor is also reported as being under attack. Note that there are two previously reported attacks, and the causality and propagation tests pass for both previous attacks (as shown in the matrix 1600). Using the time separation criterion, the DWATT attack instant must be with $15.5<\Delta t<47$ sec after those attacks. The table 1500 lists the actual $\Delta t$ as $\Delta t=53$ sec-16 sec=37 sec for CTD attack and $\Delta t=53$ sec-19 sec=34 sec for CPD attack. So, the time separation test passes for both previous attacks and, therefore, the DWATT attack is correctly reported as a "dependent attack." Note that, based some embodiments described herein, passing the time separation test even for one previously detected attack may still be enough to report DWATT as a dependent attack.

Figure 17:
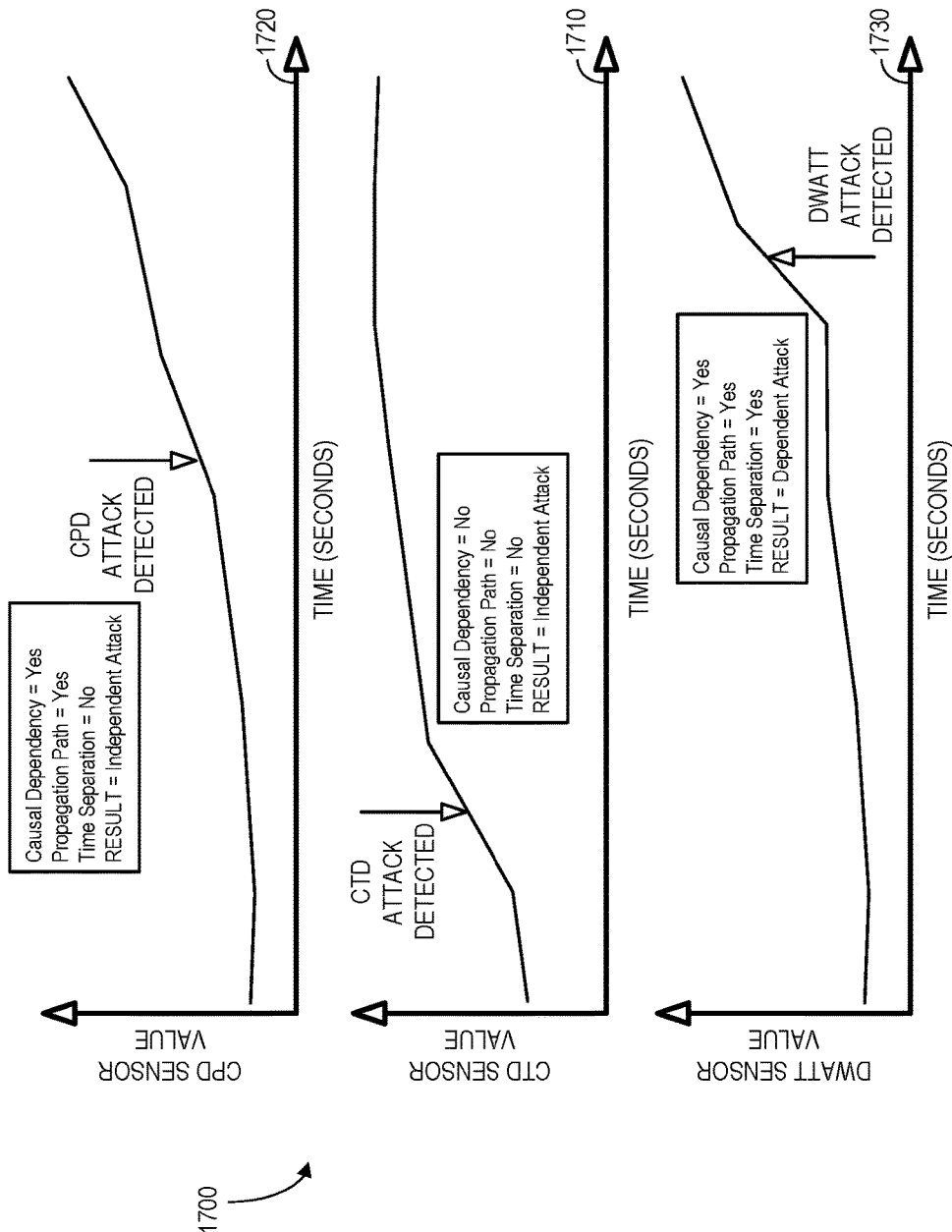
FIG. 17 is an example of attack dependency conformance tests associated with two independent attacks in accordance with some embodiments.

FIG. 17 is an example 1700 of attack dependency conformance tests associated with two independent attacks in accordance with some embodiments. In particular, a first graph 1710 illustrates when an attack on a CTD sensor was detected. With respect to the attack dependency conformance tests, none of the causal dependency, propagation path, and time separation tests were satisfied and, as a result, the attack is classified as an "independent attack." A second graph 1720 illustrates when an attack on a CPD sensor was detected. With respect to the attack dependency conformance tests, although the causal dependency and propagation path tests were satisfied, the time separation test was not satisfied and, as a result, this attack is also classified as an "independent attack." A third graph 1730 illustrates when an attack on a DWATT sensor was detected. With respect to the attack dependency conformance tests, all of the causal dependency, propagation path, and time separation tests were satisfied and, as a result, the attack is classified as a "dependent attack."

Figure 18:
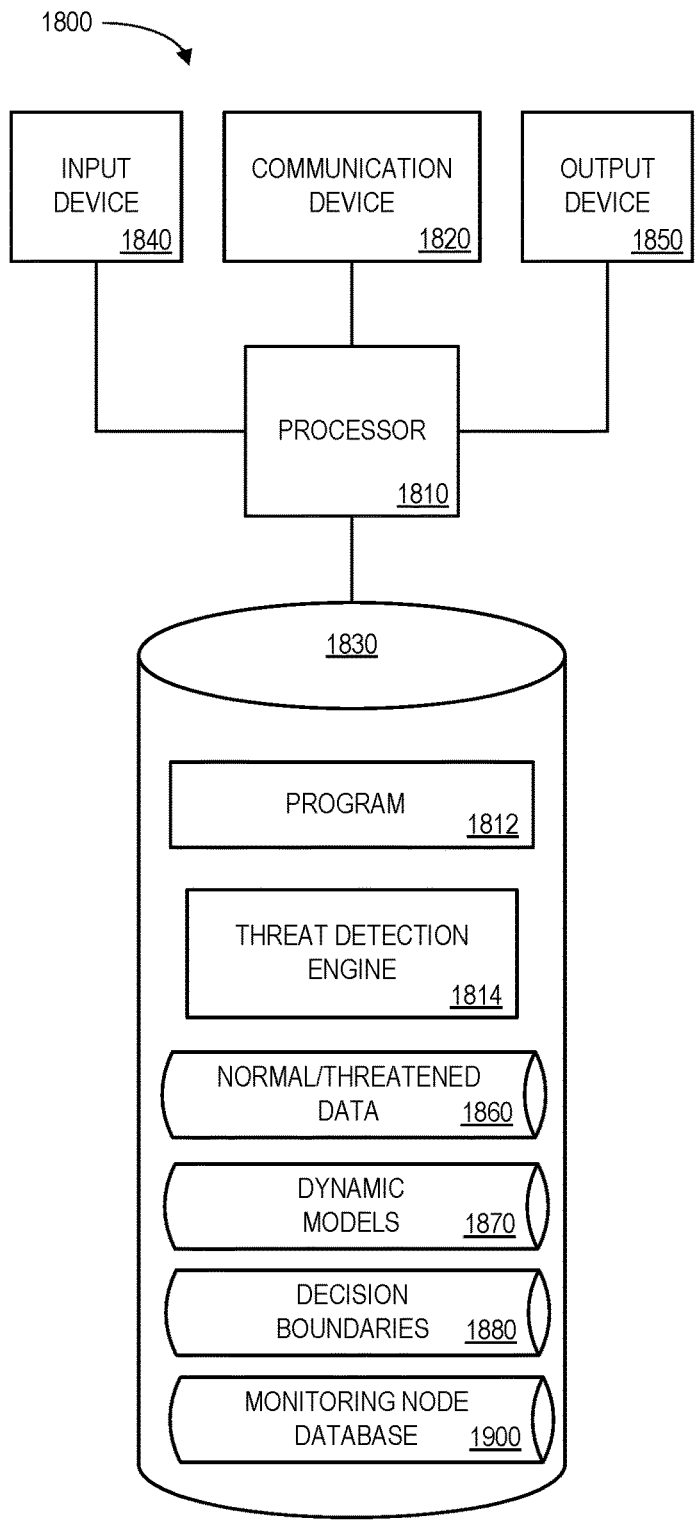
FIG. 18 is a block diagram of an industrial asset protection platform according to some embodiments of the present invention.

The embodiments described herein may be implemented using any number of different hardware configurations. For example, FIG. 18 is a block diagram of an industrial asset protection platform 1800 that may be, for example, associated with the system 180 of FIG. 1. The industrial asset protection platform 1800 comprises a processor 1810, such as one or more commercially available Central Processing Units ("CPUs") in the form of one-chip microprocessors, coupled to a communication device 1820 configured to communicate via a communication network (not shown in FIG. 18). The communication device 1820 may be used to communicate, for example, with one or more remote monitoring nodes, user platforms, etc. The industrial asset protection platform 1800 further includes an input device 1840 (e.g., a computer mouse and/or keyboard to input causal data, propagation data, time window data, etc.) and/an output device 1850 (e.g., a computer monitor to render a display, provide alerts, transmit recommendations, and/or create reports). According to some embodiments, a mobile device, monitoring physical system, and/or PC may be used to exchange information with the industrial asset protection platform 1800.

The processor 1810 also communicates with a storage device 1830. The storage device 1830 may comprise any appropriate information storage device, including combinations of magnetic storage devices (e.g., a hard disk drive), optical storage devices, mobile telephones, and/or semiconductor memory devices. The storage device 1830 stores a program 1812 and/or a threat detection engine 1814 for controlling the processor 1810. The processor 1810 performs instructions of the programs 1812, 1814, and thereby operates in accordance with any of the embodiments described herein. For example, the processor 1810 may receive a plurality of real-time monitoring node signal values over time that represent a current operation of the industrial asset control system. For each stream of monitoring node signal values, the processor 1810 may generate a current monitoring node feature vector. According to some embodiments, the feature vector may be estimated using a dynamic model associated with that monitoring node signal values. The processor 1810 may then compare the feature vector with a corresponding decision boundary for that monitoring node, the decision boundary separating a normal state from an abnormal state for that monitoring node. The processor 1810 may detect that a particular monitoring node has passed the corresponding decision boundary and classify that particular monitoring node as being under attack. The processor 1810 may then automatically determine if the attack on that particular monitoring node is an independent attack or a dependent attack.

The programs 1812, 1814 may be stored in a compressed, uncompiled and/or encrypted format. The programs 1812, 1814 may furthermore include other program elements, such as an operating system, clipboard application, a database management system, and/or device drivers used by the processor 1810 to interface with peripheral devices.

As used herein, information may be "received" by or "transmitted" to, for example: (i) the industrial asset protection platform 1800 from another device; or (ii) a software application or module within the industrial asset protection platform 1800 from another software application, module, or any other source.

In some embodiments (such as the one shown in FIG. 18), the storage device 1830 further stores normal/threatened data 1860, dynamic models 1870, decision boundaries 1880, and/or a monitoring node database 1900. An example of a database that may be used in connection with the industrial asset control system protection platform 1800 will now be described in detail with respect to FIG. 19. Note that the database described herein is only one example, and additional and/or different information may be stored therein. Moreover, various databases might be split or combined in accordance with any of the embodiments described herein.

Figure 19:
FIG. 19 is a tabular portion of an operating mode database in accordance with some embodiments.

Referring to FIG. 19, a table is shown that represents the monitoring node database 1900 that may be stored at the industrial asset protection platform 1800 according to some embodiments. The table may include, for example, entries identifying sensor nodes (and other types of nodes) associated with an industrial asset. The table may also define fields 1902, 1904, 1906, 1908, 1910, 1912, 1914 for each of the entries. The fields 1902, 1904, 1906, 1908, 1910, 1912, 1914 may, according to some embodiments, specify: a monitoring node identifier 1902, a time series of feature values 1904, an attack indication 1906, a causal indication 1908, a propagation path indication 1910, a "within time window" indication 1920, and a localization indication 1914. The monitoring node database 1900 may be created and updated, for example, off-line (non-real time) when a new physical system is monitored or modeled and then be updated (in real time) as current time series of feature values 1904 are received an analyzed during normal operation of the industrial asset.

The monitoring node identifier 1902 may be, for example, a unique alphanumeric code identifying a node to be monitored (e.g., associated with a sensor). The time series of feature values 1904 might represent estimated model outputs for each monitoring node based on observed data and extracted features. The attack indication 1906 might indicate whether or not a particular node is under attack (with "No" meaning a normal node and "Yes" meaning an abnormal or threatened node). The causal indication 1908 might reflect whether or not a causal dependency matrix indicates that an attack might be a result of an attack on another node, the propagation path indication 1910 might reflect whether a potential propagation path exists between the nodes, and the "within time window" indication 1920 might reflect whether or not the timing of the detected attacks is consistent with a relationship between the attacks. The localization indication 1914 might indicate, for example, that a node is "normal" (not under attack), is experiencing an independent attack (when any of the causal 1908, propagation path 1910, and time window 1912 indications are "No"), or is experiencing a dependent attack (when all of the causal 1908, propagation path 1910, and time window 1912 indications are "Yes").

Thus, embodiments may enable the automatic detection and localization of indications of multi-class abnormal operations using real-time signals from monitoring nodes. Moreover, the detection framework may allow for the development of tools that facilitate proliferation of the invention to various systems (i.e., gas turbines, steam turbines, wind turbines, aviation engines, locomotive engines, power grid, etc.) in multiple geolocations. According to some embodiments, distributed detection systems enabled by this technology (across multiple types of equipment and systems) will allow for the collection of coordinated data to help detect multi-prong attacks. Note that the feature-based approaches described herein may allow for extended feature vectors and/or incorporate new features into existing vectors as new learnings and alternate sources of data become available. As a result, embodiments may detect a relatively wide range of cyber-threats (e.g., stealth, replay, covert, injection attacks, etc.) as the systems learn more about their characteristics. Embodiments may also reduce false positive rates as systems incorporate useful key new features and remove ones that are redundant or less important. Note that the detection systems described herein may provide early warning to industrial asset operators so that an attack may be thwarted (or the effects of the attack may be blunted), reducing damage to equipment.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 20:
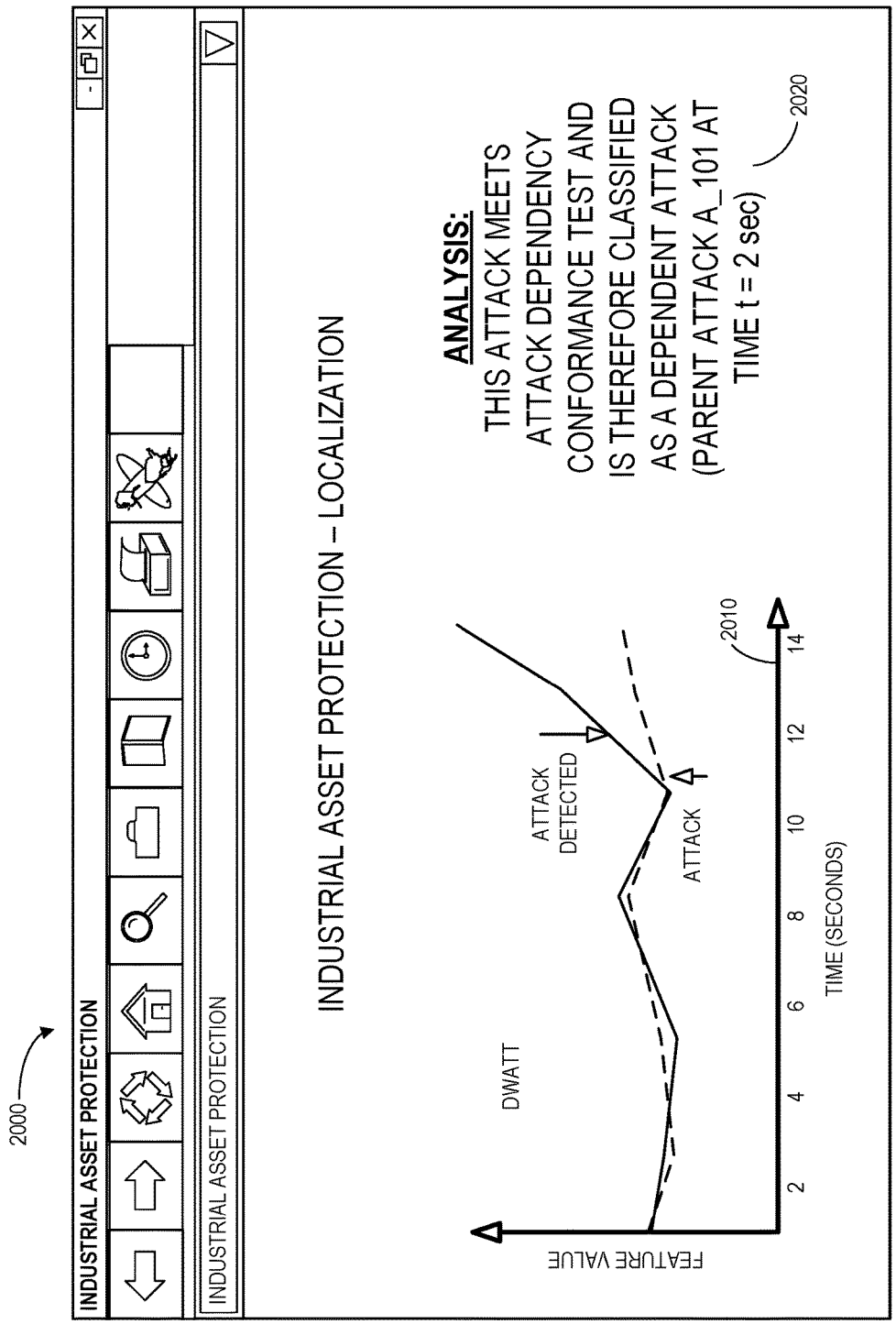
FIG. 20 is a display and/or user interface in accordance with some embodiments.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on gas turbine generators, any of the embodiments described herein could be applied to other types of assets, such as damns, the power grid, military devices, etc. Moreover, note that some embodiments may be associated with a display of monitoring node threat data to an operator. For example, FIG. 20 illustrates an interactive Graphical User Interface ("GUI") display 2000 that might display monitoring node information (e.g., including actual and estimated time series of feature values 2010 along and an attack detection indication) along with an automatically generated analysis 2020 of the data. According to some embodiments, information about attack statuses may be interwoven between different industrial asset plants. For example, one power plant might be aware of the status of other nodes (in other power plants) and such an approach might help thwart coordinated cyber-threats.

In addition to automatic threat detection, some embodiments described herein might provide systems with an additional cyber layer of defense and be deployable without custom programming (e.g., when using operating data). Some embodiments may be sold with a license key and could be incorporated as monitoring service. For example, boundaries might be periodically updated when equipment at an industrial asset plant is upgraded.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to protect an industrial asset, comprising:
a plurality of real-time monitoring node signal inputs, each input to receive a stream of monitoring node signal values over time from one of a plurality of monitoring nodes that represent a current operation of the industrial asset; and
a threat detection computer platform, coupled to the plurality of real-time monitoring node signal inputs, including:
a computer processor, and
a computer memory coupled to the computer processor, storing computer instructions that, when executed by the computer processor, cause the computer processor to:
(i) receive the streams of monitoring node signal values,
(ii) for each stream of monitoring node signal values, generate a current monitoring node feature vector,
(iii) compare each feature vector with a corresponding decision boundary for the associated monitoring node, the decision boundary separating a normal state from an abnormal state for the associated monitoring node,
(iv) detect that a first feature vector associated with a first monitoring node has passed the corresponding decision boundary and classifying the first monitoring node as being under attack, and
(v) automatically determine if the attack on the first monitoring node is an independent attack or a dependent attack based on: (a) a time a previous attack on another monitoring node was detected and (b) a propagation time through a dynamic estimator model calculated using a number of features, a number of lags in the dynamic estimator model, and a time constant of a control loop responsible for a monitoring node.

2. The system of claim 1, wherein said current monitoring node feature vector generation comprises feature vector estimation using a dynamic model.

3. The system of claim 2, wherein dynamic model output is estimated using at least one of: (i) a stochastic estimation technique, and (ii) Kalman filtering.

4. The system of claim 2, further comprising:
a training normal data set; and
a threat detection model creation computer coupled to the training normal data set, to:
(i) receive information from the training normal data set and extract feature values,
(ii) create a feature time series based on the extracted feature values, and
(iii) perform dynamic system identification in feature space for each monitoring node to generate at least one dynamic model.

5. The system of claim 4, wherein the dynamic models are created using a Vector Auto-Regressive ("VAR") model technique.

6. The system of claim 5, wherein the dynamic models are created using Bayesian Information Criterion ("BIC") or Akaike Information Criterion ("AIC").

7. The system of claim 4, further comprising:
a training attack data set,
wherein the threat detection model creation computer is coupled to the training attack data set and is further adapted to:
(i) receive information from the training normal data set and the training attack data set and extract feature values, and
(ii) create local decision boundaries for each monitoring node based on the extracted feature values.

8. The system of claim 2, wherein the dynamic model is obtained by performing dynamic system identification in feature space for each monitoring node signal value to generate at least one dynamic model.

9. The system of claim 1, wherein said current monitoring node feature vector generation comprises performing a feature transform.

10. The system of claim 9, wherein the feature transform is an identity transform.

11. The system of claim 1, wherein at least some monitoring node signal values are normalized.

12. The system of claim 1, wherein the automatic determination is further based at least in part on a causal dependency between the attack on the first monitoring node and a previously detected attack on another monitoring node.

13. The system of claim 1, wherein the automatic determination is further based at least in part on potential fulfillment of a propagation path from another monitoring node where a previous attack was detected.

14. The system of claim 1, wherein at least one monitoring node is associated with at least one of: sensor data, an auxiliary equipment input signal, a control intermediary parameter, valves, circuit breakers, and a control logic value.

15. The system of claim 1, wherein at least one monitoring node is associated with a plurality of decision boundaries and said comparison is performed in connection with each of the plurality of boundaries.

16. The system of claim 1, wherein the threat alert signal transmission is performed using at least one of: (i) a cloud-based system, (ii) an edge-based system, (iii) a wireless system, (iv) a wired system, (v) a secured network, and (vi) a communication system.

17. A computerized method to protect an industrial asset, comprising:
receiving, at a threat detection computer platform, a plurality of streams of real-time monitoring node signal values over time, each associated with a monitoring node, that represent a current operation of the industrial asset;
for each stream of monitoring node signal values, generating, by the threat detection computer platform, a current monitoring node feature vector;
comparing, by the threat detection computer platform, each feature vector with a corresponding decision boundary for the associated monitoring node, the decision boundary separating a normal state from an abnormal state for the associated monitoring node;
detecting, by the threat detection computer platform, that a first feature vector associated with a first monitoring node has passed the corresponding decision boundary and classifying the first monitoring node as being under attack; and
automatically determining, by the threat detection computer platform, if the attack on the first monitoring node is an independent attack or a dependent attack based on: (a) a time a previous attack on another monitoring node was detected and (b) a propagation time through a dynamic estimator model calculated using a number of features, a number of lags in the dynamic estimator model, and a time constant of a control loop responsible for a monitoring node.

18. The method of claim 17, wherein the automatic determination is further based at least in part on a causal dependency between the attack on that particular monitoring node and a previously detected attack on another monitoring node.

19. The method of claim 17, wherein the automatic determination is further based at least in part on potential fulfillment of a propagation path from another monitoring node where a previous attack was detected.

20. A non-transient, computer-readable medium storing instructions to be executed by a processor to perform a method of protecting an asset, the method comprising:
   receiving, at a threat detection computer platform, a plurality of streams of real-time monitoring node signal values over time, each associated with a monitoring node, that represent a current operation of the industrial asset;
   for each stream of monitoring node signal values, generating, by the threat detection computer platform, a current monitoring node feature vector;
   comparing, by the threat detection computer platform, each feature vector with a corresponding decision boundary for the associated monitoring node, the decision boundary separating a normal state from an abnormal state for the associated monitoring node;
   detecting, by the threat detection computer platform, that a first feature vector associated with a first monitoring node has passed the corresponding decision boundary and classifying the first monitoring node as being under attack; and
   automatically determining, by the threat detection computer platform, if the attack on the first monitoring node is an independent attack or a dependent attack based on: (a) a time a previous attack on another monitoring node was detected and (b) a propagation time through a dynamic estimator model calculated using a number of features, a number of lags in the dynamic estimator model, and a time constant of a control loop responsible for a monitoring node.

21. The medium of claim 20, wherein the automatic determination is further based at least in part on a causal dependency between the attack on that particular monitoring node and a previously detected attack on another monitoring node.

22. The medium of claim 20, wherein the automatic determination is further based at least in part on potential fulfillment of a propagation path from another monitoring node where a previous attack was detected.

* * * * *